United States Patent
Pfaff

(10) Patent No.: US 10,348,619 B2
(45) Date of Patent: Jul. 9, 2019

(54) GENERATING CONJUNCTIVE MATCH FLOW ENTRIES

(71) Applicant: Nicira, Inc., Palo Alto, CA (US)

(72) Inventor: Benjamin L. Pfaff, Redwood City, CA (US)

(73) Assignee: NICIRA, INC., Palo Alto, CA (US)

( * ) Notice: Subject to any disclaimer, the term of this patent is extended or adjusted under 35 U.S.C. 154(b) by 627 days.

(21) Appl. No.: 14/815,896

(22) Filed: Jul. 31, 2015

(65) Prior Publication Data

US 2017/0034049 A1   Feb. 2, 2017

(51) Int. Cl.
*H04L 12/721* (2013.01)
*H04L 12/743* (2013.01)

(52) U.S. Cl.
CPC .......... *H04L 45/38* (2013.01); *H04L 45/7453* (2013.01)

(58) Field of Classification Search
CPC ............................ H04L 45/38; H04L 45/7453
See application file for complete search history.

(56) References Cited

U.S. PATENT DOCUMENTS

| | | | |
|---|---|---|---|
| 9,363,178 B2 | 6/2016 | Pitchai et al. | |
| 9,426,061 B2 | 8/2016 | Chiba | |
| 2013/0163427 A1 | 6/2013 | Beliveau et al. | |
| 2014/0098669 A1 | 4/2014 | Garg et al. | |
| 2015/0016450 A1 | 1/2015 | Suemitsu | |
| 2015/0078386 A1 | 3/2015 | Jackson | |
| 2016/0119256 A1* | 4/2016 | Wang | H04L 12/6418 370/401 |
| 2016/0246535 A1* | 8/2016 | Bosshart | G06F 3/0635 |
| 2017/0111259 A1* | 4/2017 | Wen | H04L 45/02 |

* cited by examiner

*Primary Examiner* — Noel R Beharry
*Assistant Examiner* — Nicole King
(74) *Attorney, Agent, or Firm* — Adeli LLP

(57) ABSTRACT

Some embodiments provide a method for a network controller that manages a managed forwarding element (MFE). The method receives a set of data tuples that define packet processing behavior of the MFE. A particular one of the data tuples defines (i) a match condition with at least two conjunctive dimensions and (ii) an action for the MFE to take on a packet that matches an element from each of the dimensions, each of which include at least one element. The method generates a conjunction flow entry that matches on an assigned conjunction identifier and specifies the action defined by the particular data tuple. For each dimension, the method generates a set of flow entries that each match on a different element of the dimension and specify an action that includes the assigned conjunction identifier. The method distributes the conjunction flow entry and the sets of flow entries to the MFE.

21 Claims, 16 Drawing Sheets

GENERATING CONJUNCTIVE MATCH FLOW ENTRIES

BACKGROUND

A software virtual switch operating on a host in a datacenter will often have dozens of VMs directly connected, resulting in the virtual switch seeing thousands or even millions of packets per second. For flow-based software switching elements, numerous flow entries are required to handle all the different possible packets that might be processed. The flow entries used by such switches to process the packets are designed such that they require matching over single values for a particular field, although one flow entry may match over multiple different fields. When a switch needs to perform matches over several possible values for each of multiple packet header fields, this may cause an explosion of flow entries. As such, methods for reducing the number of flow entries in an efficient manner are needed.

BRIEF SUMMARY

Some embodiments of the invention provide a method for generating flow entries for a flow-based managed forwarding element (MFE) to implement conjunctive matching behaviors. Specifically, for a data tuple that specifies a match over multiple conjunctive dimensions (e.g., a data tuple that specifies a match over one of a set of values in a first dimension and one of a set of values in a second dimension), some embodiments provide a specific type of action that allows each dimension to be matched separately. This allows, for a data tuple specifies M values in a first dimension and N values in a second dimension, the use of M+N+1 flow entries rather than M*N flow entries.

In some embodiments, a network controller that manages a flow-based MFE receives, among a set of data tuples that define the packet processing behavior of the MFE, a data tuple that defines a match condition with at least two conjunctive dimensions and an action for the MFE to take on packets that match elements from each of the conjunctive dimensions. This network controller may be a local controller operating on the same physical machine as the MFE, or a network controller operating separately from the MFE. The network controller, rather than generating a flow entry for each possible combination of one element from each dimension, generates separate sets of flow entries for each dimension. The actions for these flow entries specify a particular type of action that indicates (i) a unique identifier assigned to the conjunction and (ii) that a particular dimension (e.g., dimension 1 of 3, dimension 2 of 2, etc.) has been matched. The network controller also generates a single additional flow entry, using the unique identifier, that is matched when a flow entry for each of the conjunctive dimensions has been matched. This flow entry specifies as its action the action defined by the conjunctive data tuple (e.g., output the packet to a particular port, forward the packet to a particular logical port, drop the packet, send the packet to the network controller, etc.).

In some embodiments, a conjunctive match may have any number of dimensions (i.e., two or more). In addition, the dimensions of a conjunctive match are defined by the organization of the Boolean logic, rather than the packet header fields on which the flow entries match. For instance, a particular dimension of a conjunctive match could match either on one of a set of values for a first field or on one of a set of values for a second field. In addition, different flow entries within a dimension might match on different bits within a field (e.g., IP network prefixes of different lengths, TCP/UDP port ranges using bitwise matches, etc.).

To implement the conjunctive match, the MFE of some embodiments organizes the various flow entries into a set of tables. In some embodiments, each conjunctive match occurs within a set of tables (or sub-tables within a single table) that are used by the MFE for one stage of a multi-stage processing pipeline. Each table within the set of tables stores the flow entries that match on a particular header field or set of header fields, which allows the MFE to use hash tables in order to perform the lookups. While some stages of the pipeline include flow entries that all match on the same set of fields and thus only require a single table, conjunctive match entries necessitate multiple tables for a single stage in some embodiments. When a dimension of the conjunctive match includes matches on two or more separate fields (e.g., either a match on one of a set of source addresses or a match on one of a set of destination addresses), this dimension will be split over a corresponding number of separate tables.

In some embodiments, the MFE traverses these tables in a particular order, which is not necessarily the order of the numbered conjunctive dimensions. When the MFE identifies a matching entry (i.e., the highest-priority matching entry) in the first table, its subsequent behavior depends on whether the matched entry belongs to a set of conjunctive match entries. If the matched entry is a non-conjunctive entry, the MFE performs the specified action and ends the processing stage, unless additional tables in the stage have the possibility to contain a higher-priority matching entry. If the matched entry belongs to a conjunctive set, the MFE proceeds to the next table to find a matching entry in this second table. If the matching entry for the second table is a higher priority entry than the matched conjunctive entry from the first table, the MFE proceeds with the matched entry from the second table in the same way as the first matched entry (using the entry if no higher priority entries remain, proceeding to the next table if higher priority entries are present or if the newly matched entry is part of a different conjunctive match set). When the second table entry is a match for the same conjunctive set, the MFE continues on to the next table to attempt to complete the conjunctive set, unless the conjunctive set is now complete (i.e., matches found in all dimensions). In that case (unless higher priority flow entries remain in the subsequent tables), the MFE sets a conjunction identifier for the packet, and proceeds to attempt find a match for the conjunction identifier.

In some cases, the MFE will reach the end of the tables without completing its conjunctive set, but also without finding a matching higher-priority entry. For instance, a packet might match one dimension of a priority 50 conjunctive match in a first table, then match one dimension of a priority 75 conjunctive match in a second table, but never match at least one of the additional dimensions of the priority 75 conjunctive match. In this case, some embodiments essentially remove the higher priority matched entries (i.e., the priority 75 entries) for the current packet and restart the processing stage to attempt to find a different match.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a method for generating flow entries for a flow-based managed forwarding element (MFE) to implement conjunctive matching behaviors. Specifically, for a data tuple that specifies a match over multiple conjunctive dimensions (e.g., a data tuple that specifies a match over one of a set of values in a first dimension and one of a set of values in a second dimension), some embodiments provide a specific type of action that allows each dimension to be matched separately. This allows, for a data tuple specifies M values in a first dimension and N values in a second dimension, the use of M+N+1 flow entries rather than M*N flow entries.

In some embodiments, a network controller that manages a flow-based MFE receives, among a set of data tuples that define the packet processing behavior of the MFE, a data tuple that defines a match condition with at least two conjunctive dimensions and an action for the MFE to take on packets that match elements from each of the conjunctive dimensions. The network controller, rather than generating a flow entry for each possible combination of one element from each dimension, generates separate sets of flow entries for each dimension. The actions for these flow entries specify a particular type of action that indicates (i) a unique identifier assigned to the conjunction and (ii) that a particular dimension (e.g., dimension 1 of 3, dimension 2 of 2, etc.) has been matched. The network controller also generates a single additional flow entry, using the unique identifier, that is matched when a flow entry for each of the conjunctive dimensions has been matched. This flow entry specifies as its action the action defined by the conjunctive data tuple (e.g., output the packet to a particular port, forward the packet to a particular logical port, drop the packet, send the packet to the network controller, etc.).

Figure 1:
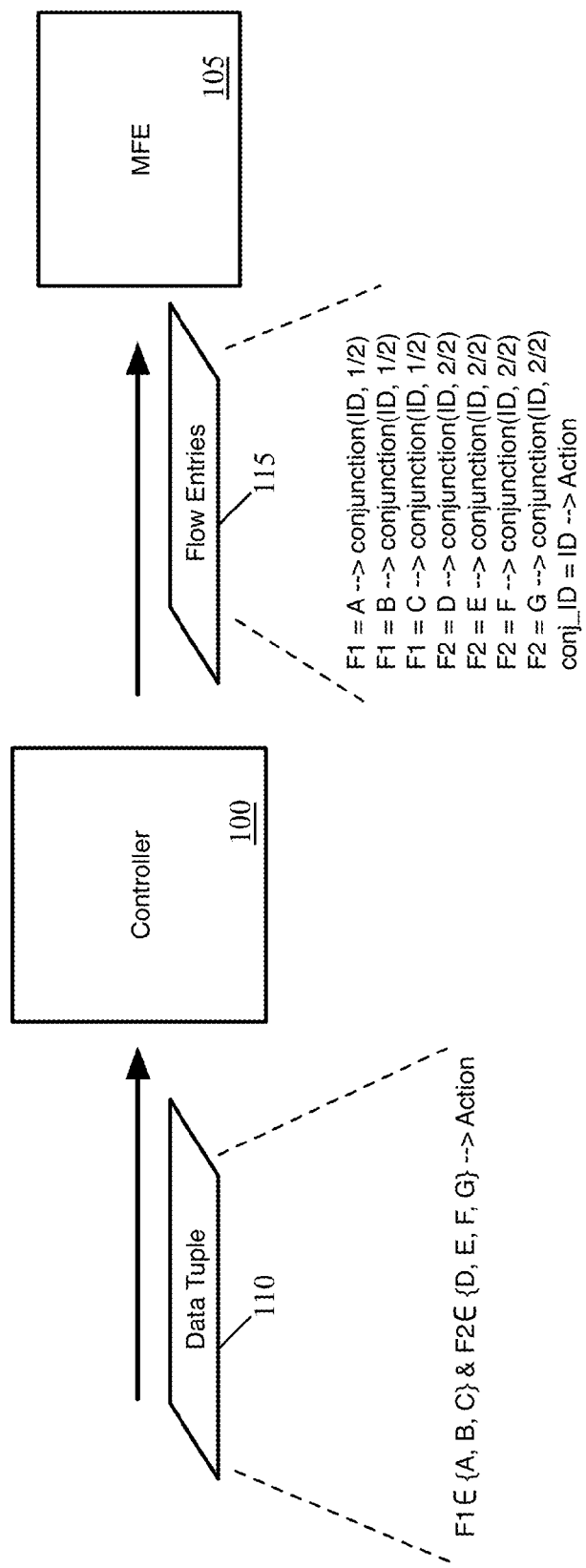
FIG. 1 conceptually illustrates a network controller of some embodiments that generates such conjunctive match flow entries for a managed forwarding element.

FIG. 1 conceptually illustrates a network controller 100 of some embodiments that generates such conjunctive match flow entries for a managed forwarding element (MFE) 105. In some embodiments, the network controller 100 is a local controller operating on the same physical machine as the MFE 105 (e.g., a host machine that also hosts data compute nodes for which the MFE is a first-hop forwarding element), and the MFE 105 is the only MFE managed by the controller 100. In other embodiments, the network controller 100 operates on a separate physical machine and manages additional MFEs. In such embodiments, the controller 100 may generate the conjunctive flow entries for other MFEs in addition to the illustrated MFE 105. The MFE 105 is a flow-based forwarding element in some embodiments, that processes packets according to flow entries that are arranged in stages. Each stage in the packet processing pipeline is implemented using one or more tables or sub-tables.

In some embodiments, the controller 100 receives data tuples (e.g., from another network controller) that define the behavior of the MFE 105. These data tuples may be received in various different formats (e.g., as a set of tables, as Boolean expressions, etc.). The controller 100 converts these data tuples into flow entries and provides the flow entries to the MFE 105 (e.g., using the OpenFlow protocol).

As shown in the figure, the controller 100 receives a data tuple 110 that specifies a particular behavior for the MFE 105. This data tuple 110 is a conjunctive match data tuple in that it specifies multiple dimensions, each with multiple possible matching values, joined by a conjunction. Specifically, in this case, the data tuple specifies that its conditions are met by a packet if the packet has a value for a first field F1 that is an element of the set {A, B, C} AND if the packet has a value for a second field F2 that is an element of the set {D, E, F, G}. The data tuple 110 also specifies an action for the MFE to take on a packet that matches this condition.

The controller 100 converts this data tuple 110 into a set of flow entries 115 and distributes these flow entries to the MFE 105. As shown, because the first dimension of the conjunctive match data tuple includes three elements and the second dimension includes four elements, the controller provides the MFE with 3+4+1=8 flow entries (as compared to the 3*4=12 flow entries that would be required to implement the conjunctive match data tuple without the conjunction action). While the savings in terms of the number of flow entries is small in the examples shown herein, it should be understood that many real-world examples will have savings of hundreds or thousands of flow entries for larger sets. As an example, a conjunctive data tuple with three sets of twelve elements results in 12+12+12+1=37 flow entries using the conjunction action, as compared to 12*12*12=1, 728 flow entries without.

The set of flow entries 115 includes three flow entries for the first dimension F1. For each of the elements of this first dimension, the controller 100 generates a flow entry with a match on the element. For each of the these flow entries, the action is the same: a specialized conjunction action that includes a unique identifier for the conjunctive match and an indicator that specifies the number of dimensions of the conjunctive match and which of these dimensions is matched. Similarly, the set of flow entries 115 also includes four flow entries for the second dimension F2, with each of these flow entries matching on one of the elements of this second dimension. The actions for these four flow entries are similar to those for the first three flow entries, but specify that the matched dimension is 2/2 rather than 1/2. Finally, the set of flow entries 115 includes an eighth flow entry that is matched when the conj_ID field of the packet has been set to the unique identifier in the conjunction actions, which is the case when flow entries for both dimensions of the conjunctive match have been matched. This last flow entry specifies as its action the action specified by the data tuple 110, such that this action is only performed if both dimensions are matched.

Though this example has only two dimensions, in some embodiments a conjunctive match may have any number of dimensions (though at least two are required). In addition, the dimensions of a conjunctive match are defined by the organization of the Boolean logic, rather than the packet header fields on which the flow entries match. For instance, while this example illustrates the simple case in which each dimension matches over a single field, in some cases a particular dimension of a conjunctive match could match either on one of a first set of values for a first field OR on one of a second set of values for a second field. In addition, different flow entries within a dimension might match on different bits within a field (e.g., IP network prefixes of different lengths, TCP/UDP port ranges using bitwise matches, etc.).

To implement the conjunctive match, the MFE of some embodiments (e.g., the MFE 105) organizes the various flow entries into a set of tables. In some embodiments, each conjunctive match occurs within a set of tables (or sub-tables within a single table) that are used by the MFE for one stage of a multi-stage processing pipeline. Each table within the set of tables stores the flow entries that match on a particular header field or set of header fields, which allows the MFE to use hash tables in order to perform the lookups. While some stages of the pipeline include flow entries that all match on the same set of fields and thus only require a single table, conjunctive match entries necessitate multiple tables for a single stage in some embodiments. When a dimension of the conjunctive match includes matches on two or more separate fields (e.g., either a match on one of a set of source addresses or a match on one of a set of destination addresses), this dimension will be split over a corresponding number of separate tables.

In the example of FIG. 1, the first three of the flow entries 115 (matching on F1) are part of a first table (or sub-table), while the next four of the flow entries (matching on F2) are part of a second table (or sub-table). These tables are evaluated within a single stage of the processing pipeline, and each of the tables might also include additional flow entries based on other data tuples (possibly including both conjunctive and standard (non-conjunctive) matches) received by the controller specifying actions for these different values of the fields F1 and/or F2. In some embodiments, the last flow entry is made part of a subsequent stage, allowing for the conjunction action of the earlier stage to store the conj_ID field with the packet and then submit the packet to the subsequent stage (e.g., with a resubmit action).

In some embodiments, the MFE traverses these tables within a stage in a particular order, which is not necessarily the order of the numbered conjunctive dimensions. When the MFE identifies a matching entry (i.e., the highest-priority matching entry) in the first table, its subsequent behavior depends on whether the matched entry belongs to a set of conjunctive match entries. If the matched entry is a non-conjunctive entry, the MFE performs the specified action and ends the processing stage, unless additional tables in the stage have the possibility to contain a higher-priority matching entry. If the matched entry belongs to a conjunctive set, the MFE proceeds to the next table to find a matching entry in this second table. If the matching entry for the second table is a higher priority entry than the matched conjunctive entry from the first table, the MFE proceeds with the matched entry from the second table in the same way as the first matched entry (using the entry if no higher priority entries remain, proceeding to the next table if higher priority entries are present or if the newly matched entry is part of a different conjunctive match set). When the second table entry is a match for the same conjunctive set, the MFE continues on to the next table to attempt to complete the conjunctive set, unless the conjunctive set is now complete (i.e., matches found in all dimensions). In that case (unless higher priority flow entries remain in the subsequent tables), the MFE sets a conjunction identifier for the packet, and proceeds to attempt find a match for the conjunction identifier.

In some cases, the MFE will reach the end of the tables without completing its conjunctive set, but also without finding a matching higher-priority entry. For instance, a packet might match one dimension of a priority 50 conjunctive match in a first table, then match one dimension of a priority 75 conjunctive match in a second table, but never match at least one of the additional dimensions of the priority 75 conjunctive match. In this case, some embodiments essentially remove the higher priority matched entries (i.e., the priority 75 entries) for the current packet and restart the processing stage to attempt to find a different match.

The above describes the conjunctive match operation of some embodiments The following sections describe the flow entry generation for conjunctive match operations and the implementation of the conjunctive match operations in greater detail. Section I describes the generation of flow entries by a network controller for conjunctive match data tuples. Section II then describes in detail the implementation and use of conjunctive match flow entries in a packet processing stage by the MFE of some embodiments. Finally, Section III describes an electronic system with which some embodiments of the invention are implemented.

I. Generating Conjunctive Match Flow Entries

As mentioned above, some embodiments provide a method for generating flow entries for a flow-based managed forwarding element (MFE) to implement conjunctive matching behaviors. Specifically, for a data tuple that specifies a match over multiple conjunctive dimensions (e.g., a data tuple that specifies a match over one of a set of values in a first dimension and one of a set of values in a second dimension), some embodiments provide a specific type of action that allows each dimension to be matched separately within a single stage.

Figure 2:
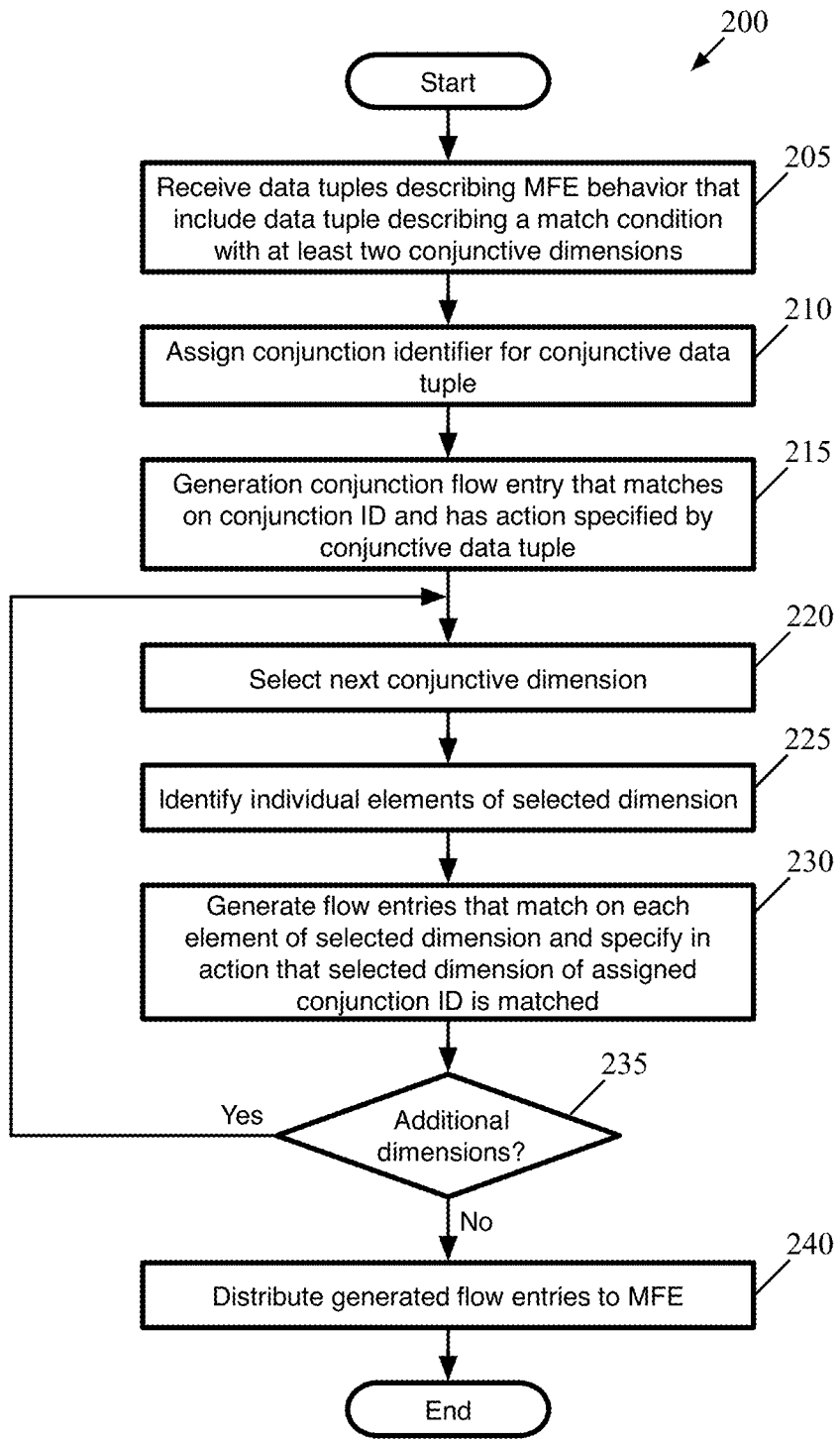
FIG. 2 conceptually illustrates a process of some embodiments for generating conjunctive match flow entries for distribution to a MFE.

FIG. 2 conceptually illustrates a process 200 of some embodiments for generating the conjunctive match flow entries for distribution to a MFE. The process 200 is performed in some embodiments by a network controller that converts data tuples into flow entries for a flow-based MFE. In some embodiments, the network controller manages only a single MFE and operates on the same physical machine as the MFE (e.g., as a local controller agent). The MFE may operate on a host machine along with VMs or other data compute nodes (e.g., containers) that directly connect to the MFE. In other embodiments, the controller and/or MFE operate on separate physical machines. For example, the controller might operate on a first physical machine, the MFE on a second physical machine, and the VMs and/or physical hosts that send packets to and receive packets from the MFE might operate on one or more additional physical machines. In still other embodiments, the MFE operates on the same physical machine as the data compute nodes, while the network controller operates on a separate physical machine and manages many MFEs (i.e., generates flow entries for the many MFEs). The process 200 relates specifically to generating flow entries for a single MFE; however, it should be understood that such a process could easily be adapted to generate flow entries for numerous MFEs based on a single received data tuple.

As shown, the process 200 receives (at 205) a set of data tuples describing MFE behavior. The set of data tuples includes a particular data tuple describing a match condition with at least two conjunctive dimensions. These data tuples may be received from another network controller in some embodiments. For example, the data tuples might describe a particular logical forwarding element or set of logical forwarding elements (that form a logical network) that are implemented in a distributed manner by numerous MFEs within a network (e.g., within a datacenter). The data tuples may be received in various different formats in different embodiments (e.g., as a set of tables, as Boolean expressions, etc.).

The particular data tuple is a conjunctive match data tuple in that it specifies multiple dimensions, each with multiple possible matching values, joined by a conjunction. That is, the data tuple specifies a condition that is matched by a packet when at least a first value associated with the packet (e.g., a first packet header field value or metadata field value) is an element of a first set of values specified by the match condition AND a second value associated with the packet is an element of a second set of values specified by the match condition. In some cases, more complex conjunctive data tuples may be received (e.g., with numerous conjunctive dimensions, with disjunctive expressions for one or more of the conjunctive dimensions, etc.). So long as the data tuple describes a match condition with multiple conjunctive dimensions, each of which can be met in more than one way, the data tuple is treated by the network controller as a conjunctive match data tuple.

The process 200 then assigns (at 210) a conjunction identifier for the conjunctive data tuple. This identifier is used in the flow entries for the conjunctive match, as described above by reference to FIG. 1. In some embodiments, the conjunction identifier assigned to a set of conjunctive flow entries is unique among all the sets of conjunctive flow entries used by the MFE. In other embodiments, a conjunctive identifier need only be unique among all sets of conjunctive flow entries used by the MFE that have the same priority. Different embodiments may use different lengths for this identifier (e.g., 16 bits, 32 bits, etc.).

The process then generates (at 215) a conjunction flow entry that matches on the conjunction identifier and has the action specified by the particular conjunctive data tuple. In some embodiments, each flow entry includes (i) a set of one or more match conditions and (ii) a set of one or more actions to perform when the match conditions are met. The packets received by the MFE are matched against the match conditions, and the MFE performs the specified actions when the packet matches the match conditions (and there are no higher priority flow entries for which the match conditions are matched). For the conjunction flow entry, the match condition is that the assigned conjunction identifier has been stored with the packet (e.g., in a register or metadata field of the packet), which is the action taken by the MFE when all of the conjunctive dimensions are matched (using the flow entries for the conjunctive dimensions generated by operations 220-230).

In addition to generating the conjunction flow entry, the process 200 generates the flow entries for each of the conjunctive dimensions. Though illustrated as being performed after the generation of the conjunction flow entry, it should be understood that this is merely conceptual and that different embodiments may generate the flow entries for the conjunctive dimensions first, generate the flow entries in parallel, etc. As shown, the process selects (at 220) a next conjunctive dimension. In some embodiments, the ordering of the conjunctive dimensions (i.e., designating one the first dimension, another as the second dimension, etc.) is arbitrary and does not affect the flow entry generation by the network controller or evaluation by the MFE.

The process 200 then identifies (at 225) the individual elements of the selected dimension. In some embodiments, the elements are simply the members of a set. For instance, the data tuple might specify one dimension as "tp_src∈{80, 443, 8008}", in which case identification of the three elements is simple (the tp_src (source transport layer port) field must match one of the three specified values). A dimension could also have a disjunctive operator, such as "tp_src∈{80, 443, 8008} OR tp_dst∈{80, 443, 8008}", in which case there are six elements (three that match on the tp_src field and three that match on the tp_dst field). In some embodiments, dimensions could even have their own conjunctions (which are not implemented as a separate conjunctive match). For example, a conjunctive dimension could be "tp_src∈{80, 443, 8008} OR (tp_dst=28 & tp_src=28)", which would be satisfied either by the tp_src field matching one of the first three elements, or by a fourth element that requires a match on both the tp_dst and tp_src fields). In addition, different elements may match on different bits within a single field. As an example, the conjunctive dimension "tp_src∈{0-15, 80} could be implemented as two elements, the first element a match that the first 12 bits of the 16-bit tp_src field equal 0, and the second element an exact match on all 16 bits of the field. Similarly, different length IP prefixes could result in matches over different numbers of bits of the source or destination IP addresses of a packet. In addition, conjunctive data tuples may include negation in some embodiments. For instance, a dimension of a conjunctive flow could be defined as "tp_src≠80", which would be converted into "tp_src∈{0-79} OR tp_src∈{81-65535}, which can be generated as bitwise matches.

For each of the identified elements, the process generates (at 230) a flow entry that matches on the identified element. The actions specified by these flow entries are the same for each element. In some embodiments, these actions specify that the selected dimension of the conjunctive match (identified by the assigned conjunction identifier) is matched. In some embodiments, the syntax uses a specialized action (e.g., the "conjunction" action) that has as its parameters (i) the assigned conjunction identifier and (ii) the dimension indicator, which also specifies the total number of dimensions (e.g., 1/2, 2/2, 2/3, etc.).

The process 200 determines (at 235) whether any additional dimensions remain for which flow entries need to be generated. In some embodiments, at least two conjunctive dimensions are required, as having only a single dimension would remove the need for the conjunctive flows. A single dimension with multiple elements would simply require several flow entries with the same action. When additional dimensions remain, the process returns to 220 to generate the flow entries for the next dimension.

Once the process has completed the flow entry generation, the process 200 distributes (at 240) the generated flow entries to the MFE and ends. In some embodiments, the flow entries are distributed via the OpenFlow protocol to the MFE, while other embodiments may use other protocols for distributing the flow entries (e.g., depending on the type of MFE).

Figure 3:
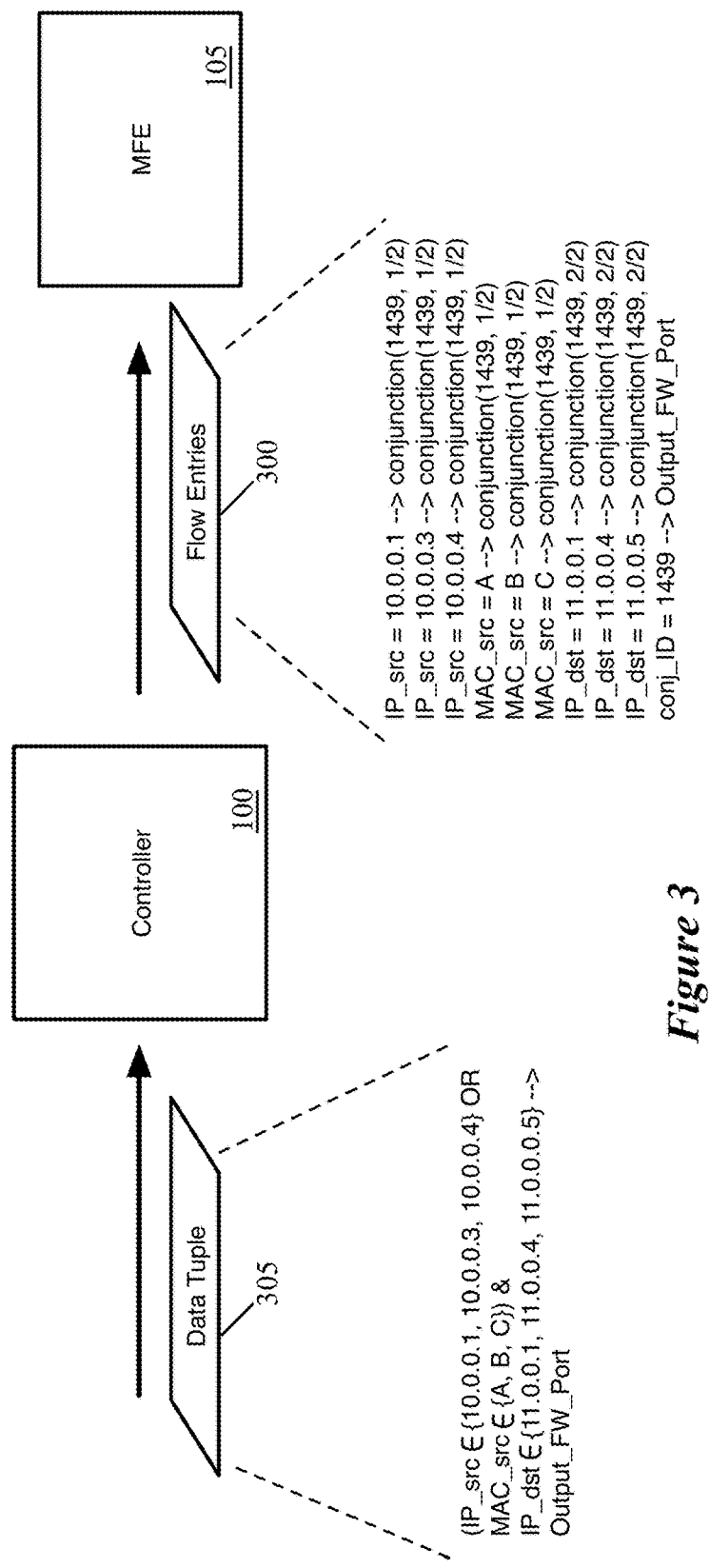
FIGS. 3-5 conceptually illustrate examples of the flow entries generated by a controller for an MFE, for various different conjunctive data tuples.
Figure 4:
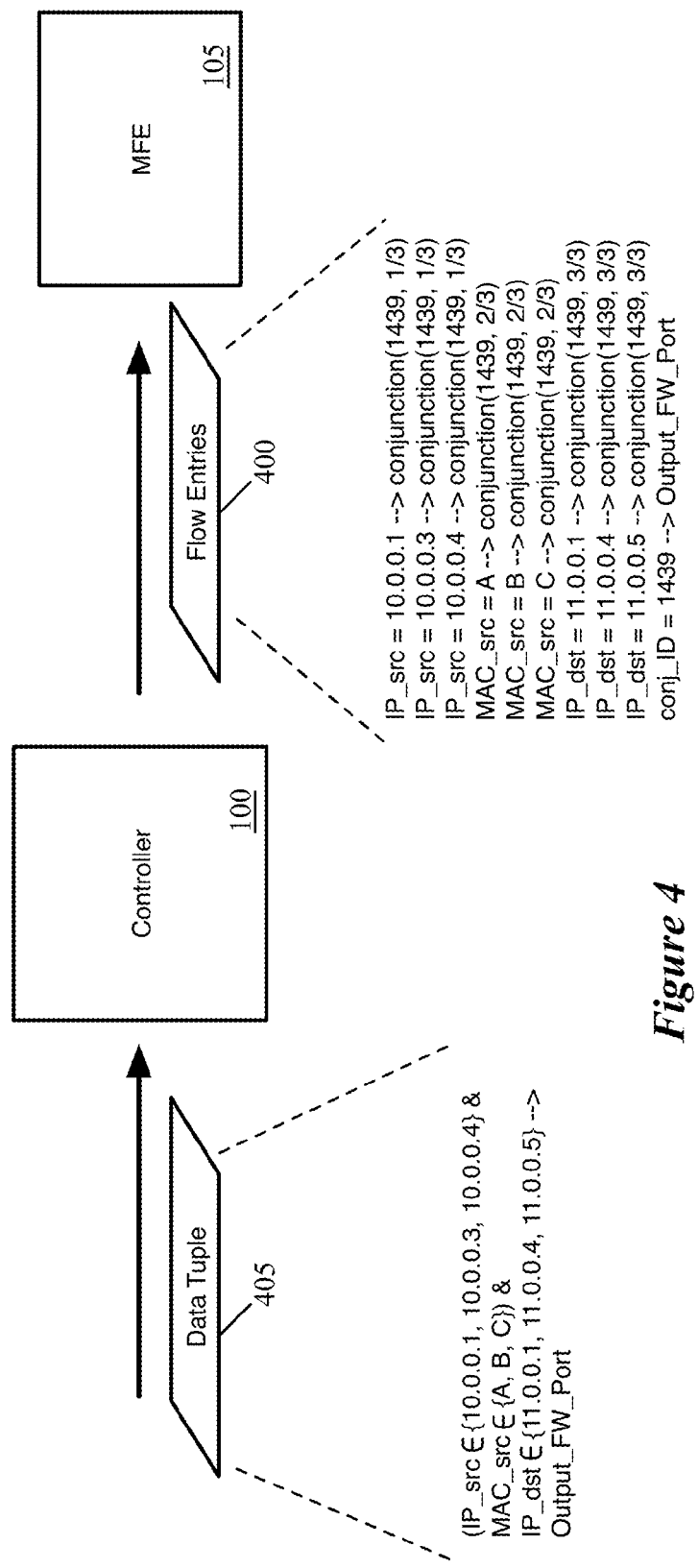
Figure 5:
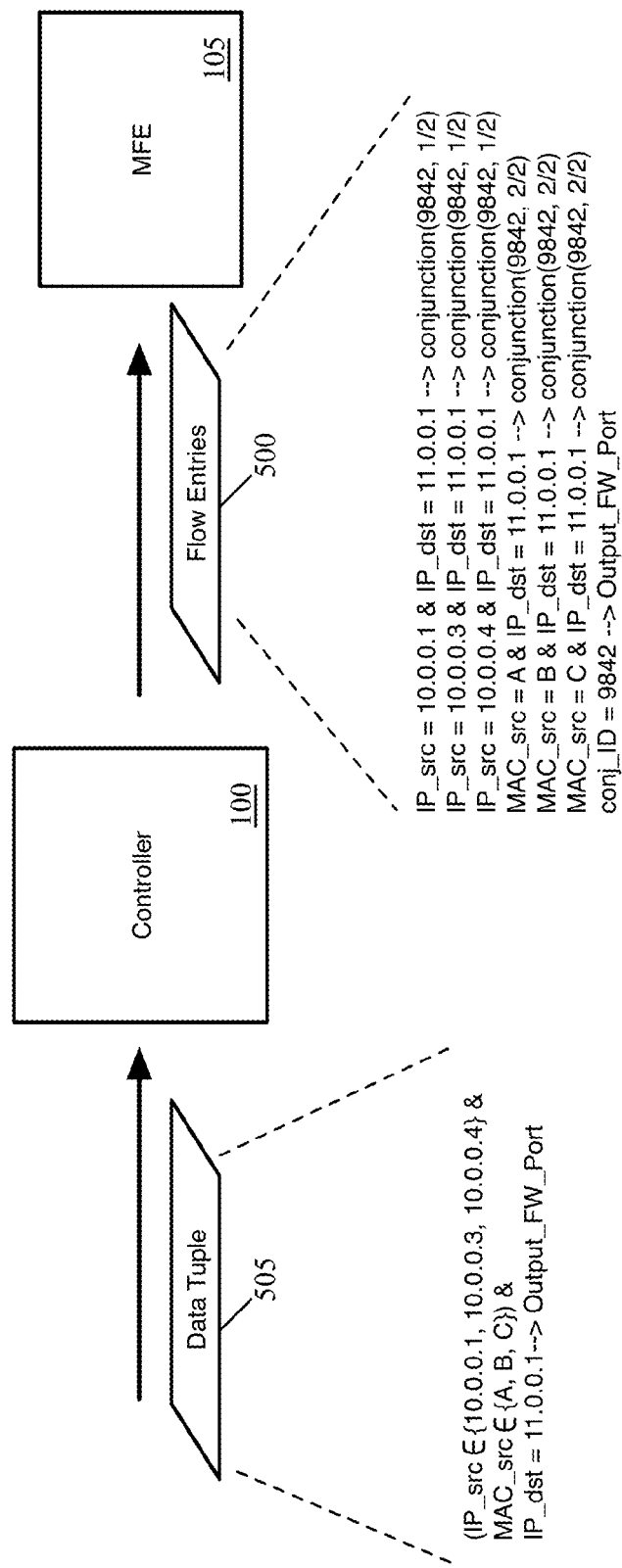

FIGS. 3-5 conceptually illustrate examples of the flow entries generated by the controller 100 of FIG. 1 for the MFE 105, for various different conjunctive data tuples. FIG. 3 conceptually illustrates a data tuple 305 received by the controller 100, which specifies a match condition of "IP_src∈{10.0.0.1, 10.0.0.3, 10.0.0.4} OR MAC_src∈{A, B, C} AND IP_dst∈{11.0.0.1, 11.0.0.4, 11.0.0.5}" and an action of "Output_FW_Port". This data tuple includes two conjunctive dimensions, one of which includes a disjunction between two different packet header fields.

The first conjunctive dimension is met by either the source IP address or the source MAC address, and has six elements which are illustrated by the first six of the generated flow entries 300. The first three flow entries match on the three source IP addresses specified by the data tuple, while the next three flow entries match on the three source MAC addresses. The action for all six of these flow entries is the same: a conjunction action, indicating the unique conjunction identifier ("1439"), and that the first of two conjunctive dimensions is satisfied. It should be understood that the flow entries might also require additional matches for functionality within the MFE. For example, some embodiments automatically add a match that the packet is in fact an IP packet (i.e., that the Ethertype field equals 800) when the specified match fields (or fields modified by the action) require it. Thus, the first three flow entries for the first dimension that match on the source IP address (and the flow entries for the second dimension, that match on the destination IP address) would also have a second match on the Ethertype field. In addition, if the flow entries are part of the processing for a logical forwarding element, additional matches on the logical forwarding element identifier may be required, as well as stage register/metadata matches, etc.

The second conjunctive dimension only matches on the destination IP address field, and has three elements for which three flow entries are generated by the controller 100. The action for these three flow entries is similar to the first six, but the conjunction action indicates that the second of the two conjunctive dimensions is satisfied. Lastly, the set of flow entries includes the entry specifying the action to take if the conjunctive match is met. This flow entry indicates that if a packet has a conjunction identifier value that matches the assigned conjunction identifier ("1439"), then the action specified by the conjunctive match data tuple should be performed by the MFE (outputting the packet to a firewall port). In some embodiments, the controller 100 may modify this action to include a specific port of the MFE rather than the more generic port specified in the data tuple received by the controller.

FIG. 4 conceptually illustrates another example of flow entries 400 generated by the controller 100 for the MFE 105, based on a conjunctive match data tuple 405. This data tuple 405 includes three conjunctive dimensions, as compared to the previous examples with two dimensions. The first dimension matches on the source IP address field and includes three elements, the second dimension matches on the source MAC address field and includes three elements, and the third dimension matches on the destination IP address and includes three elements. Thus, nine flow entries are generated with matches on the nine elements, with the IP_src flow entries specifying in the conjunction action that the first dimension of three has been satisfied, the MAC_src flow entries specifying in their conjunction action that the second dimension of three has been satisfied, and the IP_dst flow entries specifying in their conjunction action that the third of three dimensions has been satisfied. The last flow entry, specifying a match on the conjunction identifier, is the same irrespective of the number of dimensions of the conjunctive match.

FIG. 5 conceptually illustrates another example of flow entries 500 generated by the controller 100 for the MFE 105, based on another conjunctive match data tuple 505. This data tuple 505 includes three conjunctive dimensions, but one of these dimensions includes only one element. While this element (in this case, a match on the destination IP address) could be implemented as a separate conjunctive dimension in the flow entries, it can also be added to each of the flow entries of the other dimensions. Thus, the controller 100 generates flow entries for only two dimensions, with a match on the destination IP address field equaling 11.0.0.1 added to each of these six flow entries. This saves the use of a flow entry, and more importantly avoids unnecessary lookups by the MFE (e.g., if the destination IP address is not matched, none of the conjunctive flow entries will be matched for either dimension, and thus needless lookups to the other tables can be avoided).

II. Implementation of Conjunctive Matching by MFE

To implement the conjunctive match, the MFE of some embodiments organizes the various flow entries into a set of tables. In some embodiments, each conjunctive match occurs within a set of tables (or sub-tables within a single table) that are used by the MFE for one stage of a multi-stage processing pipeline. Each table within the set of tables stores the flow entries that match on a particular header field or set of header fields, which allows the MFE to use hash tables in order to perform the lookups. While some stages of the pipeline include flow entries that all match on the same set of fields and thus only require a single table, conjunctive match entries necessitate multiple tables for a single stage in some embodiments. When a dimension of the conjunctive match includes matches on two or more separate fields (e.g., either a match on one of a set of source addresses or a match on one of a set of destination addresses), this dimension will be split over a corresponding number of separate tables.

These tables are evaluated within a single stage of the processing pipeline, and each of the tables might also include additional flow entries based on other data tuples (possibly including both conjunctive and standard (non-conjunctive) matches) received by the controller specifying actions for different values of the fields matched by the conjunctive match dimensions. In some embodiments, the last flow entry (i.e., the match on the conjunction identifier) is made part of a subsequent stage, allowing for the conjunction action of the earlier stage to store the conj_ID field with the packet and then submit the packet to the subsequent stage (e.g., with a resubmit action).

In some embodiments, the MFE traverses these tables within a stage in a particular order, which is not necessarily the order of the numbered conjunctive dimensions. When the MFE identifies a matching entry (i.e., the highest-priority matching entry) in the first table, its subsequent behavior depends on whether the matched entry belongs to a set of conjunctive match entries. If the matched entry is a non-conjunctive entry, the MFE performs the specified action and ends the processing stage, unless additional tables in the stage have the possibility to contain a higher-priority matching entry. If the matched entry belongs to a conjunctive set, the MFE proceeds to the next table to find a matching entry in this second table. If the matching entry for the second table is a higher priority entry than the matched conjunctive entry from the first table, the MFE proceeds with the matched entry from the second table in the same way as the first matched entry (using the entry if no higher priority entries remain, proceeding to the next table if higher priority entries are present or if the newly matched entry is part of a different conjunctive match set). When the second table entry is a match for the same conjunctive set, the MFE continues on to the next table to attempt to complete the conjunctive set, unless the conjunctive set is now complete (i.e., matches found in all dimensions). In that case (unless higher priority flow entries remain in the subsequent tables), the MFE sets a conjunction identifier for the packet, and proceeds to the next stage to attempt find a match for the conjunction identifier.

Figure 6:
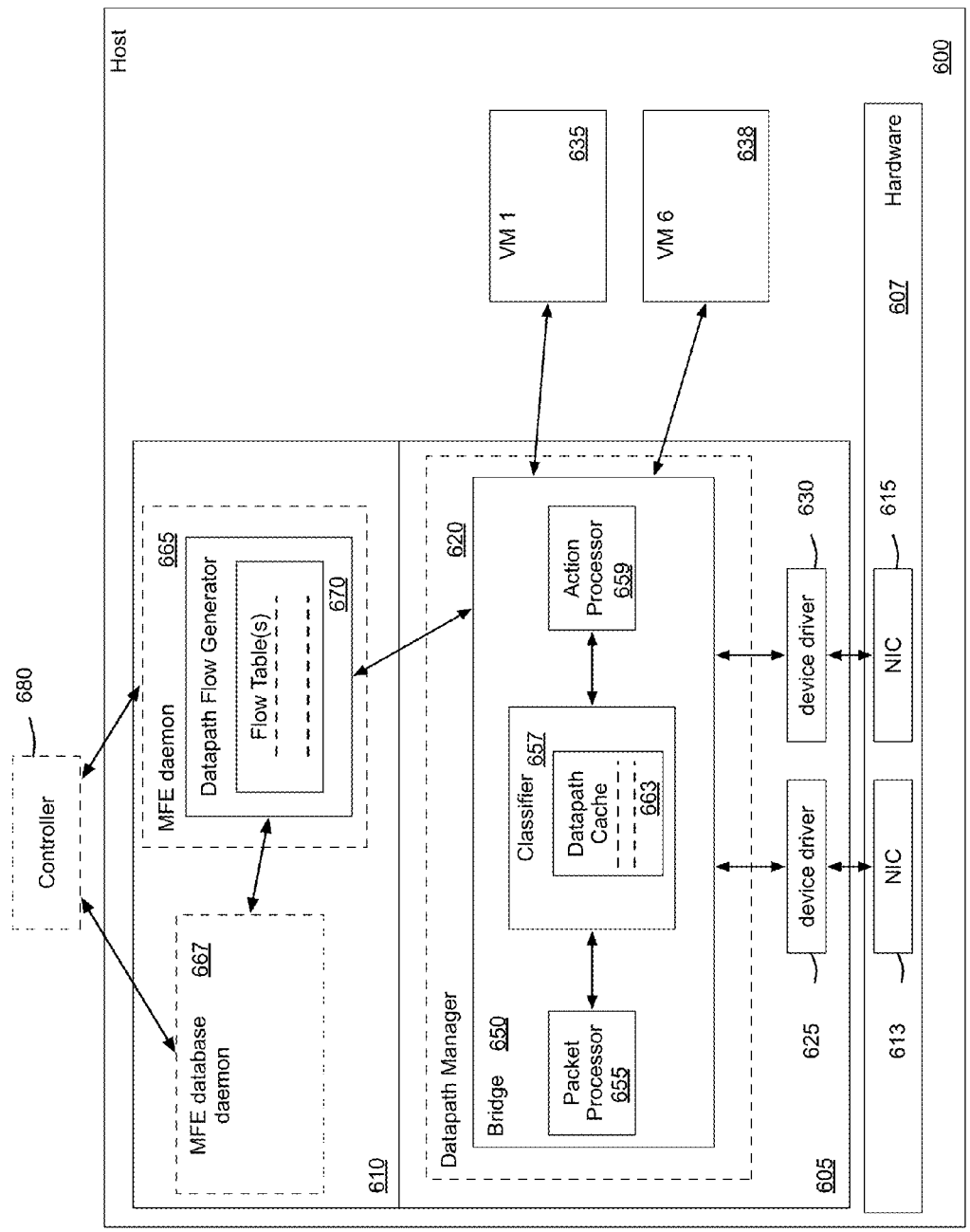
FIG. 6 conceptually illustrates an architectural diagram of a host machine on which a software-implemented MFE of some embodiments is implemented.

FIG. 6 conceptually illustrates an architectural diagram of a host machine 600 on which a software-implemented MFE 605 of some embodiments is implemented. In some embodiments, the MFE is implemented in the virtualization software (e.g., in the hypervisor) of the host 600. In this example, the MFE includes several components, including a datapath manager 620 as well as a MFE daemon 665 and MFE database daemon 667. In some embodiments, the datapath manager 620 operates in a kernel of the virtualization software while the MFE daemon 665 and the MFE database daemon 667 both operate in the user space of the virtualization software.

As shown in FIG. 6, the host 600 includes hardware 607 (though this is a software architecture diagram, the hardware 607 is displayed in order to represent the NICs 613 and 615 of the host machine), virtualization software kernel 605, virtualization software user space 610, and two VMs 635 and 638. The hardware 607 may include typical computer hardware (e.g., processing units, volatile memory (e.g., RAM), nonvolatile memory (e.g., hard disk, optical disks, solid-state memory, etc.), network adapters, etc. As shown, the hardware 607 also includes network interface controllers (NICs) 613 and 615 for connecting a computing device to a network.

The virtualization software is a software abstraction layer that operates on top of the hardware 607 and below any operating system in some embodiments. In some embodiments, the kernel of the virtualization software performs virtualization functionalities (e.g., to virtualize the hardware 607 for several virtual machines operating on the host machine). The kernel handles various management tasks, such as memory management, processor scheduling, or any other operations for controlling the execution of the VMs 635 and 638 operating on the host machine.

As shown, the virtualization software includes device drivers 625 and 630 for the NICs 613 and 615, respectively. The device drivers 625 and 630 allow an operating system to interact with the hardware of the host 600. The VMs 635 and 638 are independent virtual machines operating on the host 600, and may run any number of different operating systems (e.g., Linux, Solaris, FreeBSD, or any other type of UNIX based operating system, Windows-based operating systems, etc.).

The virtualization software also includes the MFE daemon 665 and the MFE database daemon 667, as well as a set of service modules 640. The MFE daemon 665 is an application that runs in the background of the virtualization software. The MFE daemon 665 of some embodiments receives configuration data from the network controller 680 (which may be a local chassis controller operating on the host 600, or a network controller operating on a separate physical machine to manage several host machines) and the MFE database daemon 667. For instance, from the controller, the MFE daemon 665 of some embodiments receives generated flow entries (e.g., the conjunctive match flow entries) that specify packet processing operations to apply to packets when the packets match a set of conditions.

The MFE daemon 665 stores the received flow entries in the flow tables 675. In some embodiments, the flow tables are organized in stages (e.g., stages of packet processing), with one or more stages for each of several logical forwarding elements. For instance, a logical switch might have an ingress mapping stage, an ingress ACL stage, a logical forwarding stage, an egress ACL stage, etc.). For a MFE implementing multiple logical networks, each of the logical networks has several stages of flow tables in some embodiments. In addition, within a stage, several tables or sub-tables may be used if there can be matches over several different packet header fields. For example, each dimension of a conjunctive match within a stage will have at least one table or sub-table. Each table (or sub-table) in some embodiments matches on a specific set of packet header fields. This allows the use of hash tables as an efficient mechanism to identify matching flow entries, with the specific set of packet header fields being hashed and looked up in the hash table corresponding to a table of similar flow entries.

In some embodiments, the MFE daemon 665 communicates with the network controller 680 using the OpenFlow Protocol, while the MFE database daemon 667 communicates with the network controller 665 through a database communication protocol (e.g., OVSDB protocol). The database protocol of some embodiments is a JavaScript Object Notation (JSON) remote procedure call (RPC) based protocol.

The MFE database daemon 667 is also an application that runs in the background of the user space 610 in some embodiments. The MFE database daemon 667 of some embodiments communicates with the network controller 680 in order to configure certain aspects of the MFE (e.g., of the MFE daemon 665 and/or the kernel module 620) other than the installation of flow entries. For instance, the MFE database daemon 667 receives management information from the network controller 680 for configuring bridges, ingress ports, egress ports, QoS configurations for ports, etc., and stores the information in a set of databases that help define the configuration of the MFE.

As illustrated in FIG. 6, the MFE 605 includes the datapath manager 620. datapath manager 620 processes and forwards network data (e.g., packets) between VMs and other data compute nodes running on the host 600 and network hosts external to the host (e.g., network data received through the NICs 613 and 615). In some embodiments, the VMs 635 and 638 running on the host 600 couple to the datapath manager through a bridge 650.

In some embodiments, the bridge 650 manages a set of rules (e.g., flow entries) that specify operations for processing and forwarding packets. The bridge 650 communicates with the MFE daemon 665 in order to process and forward packets that the bridge 650 receives. In the example of FIG. 6, the bridge 650 includes a packet processor 655, a classifier 657, and an action processor 659.

The packet processor 655 receives a packet and parses the packet to strip header values. The packet processor 655 can perform a number of different operations. For instance, in some embodiments, the packet processor 655 is a network stack that is associated with various network layers to differently process different types of data that it receives. Irrespective of all the different operations that it can perform, the packet processor 655 passes the header values to the classifier 657. In some embodiments, the packet processor stores these header values in one or more registers or metadata fields that are stored for a packet. In some embodiments, the packet processor 655 defines an object for the packet that includes the registers. The packet object is then used to represent the packet in the MFE.

The classifier 657 accesses one or more datapath caches 663 (also referred to as a flow cache) to find matching flow entries for different packets. For instance, in some embodiments, the classifier includes a flow aggregate cache that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries in the datapath cache 663 specifies an action for the action processor 659 to perform on packets that match the flow entries. These datapath cache flow entries are installed by the classifier 657, in some embodiments, based on processing of a packet through the set of flow tables 675 by the MFE daemon 665

The classifier 657 also, or alternatively, includes an exact-match cache in some embodiments. The exact-match cache of some embodiments includes entries that are matched by packets belonging to specific data flows (using, e.g., a flow key of packet headers extracted from the packet that uniquely identifies a connection). In some embodiments, an exact-match cache entry includes the match conditions (e.g., the flow key) and either an action or a reference to one of the flow entries in the traffic aggregate cache. As such, multiple different exact-match entries might refer to the same cached flow entry (e.g., for similar data flows for the packets of which the forwarding element will perform the same action).

When the classifier 657 receives the header values for a packet, it first performs a check with the exact-match cache 653 to determine whether the packet belongs to a data flow that already has an entry in the cache 653. If a match is found in the exact-match cache, the classifier sends the packet to the action processor 659 with the action specified by the matched entry. When the packet does not belong to a data flow for which the exact-match cache already stores an entry, the classifier 657 performs a lookup on the aggregate flow cache to find a matching flow entry. When a matching flow entry is found in the aggregate flow cache, the classifier stores a new exact-match cache entry which can be used for subsequent packets that belong to the same data flow.

In certain cases, no matching flow entries can be found in the datapath cache (e.g., for the first packet of a data flow that does not share enough characteristics with other data flows). In these cases, the MFE shifts control of the packet processing to the MFE Daemon 665 for a full set of packet processing operations (i.e., executing of numerous lookup stages over the flow tables 675, possibly including conjunctive match lookups). One primary distinction between the cache 663 and the set of flow tables 675 is that there is at most only one matching flow entry for a packet in the cache 663. The cached flow entries specify all of the actions to take in order to process the packet, whereas each of the flow entries in the tables 675 only specify the actions for that stage, often specifying a resubmit action for processing by the next packet processing stage. After completing the processing for a packet, the classifier 657 sends the packet to the action processor 659. The action processor 659 performs the set of actions specified for the packet.

The MFE daemon 665 of some embodiments includes a datapath flow generator 670. The datapath flow generator 670 is a component of the MFE that makes forwarding and other packet processing decisions. For any packet that is not matched in the datapath cache 663 (e.g., because the packet is the first in a new transport-layer connection), the datapath flow generator 670 performs the one or more flow table lookups required to process the packet, and then generates a new flow entry to install in the cache 663. In some embodiments, the datapath flow generator includes or works in conjunction with a separate classifier (not shown) in order to find one or more matching flow entries in the flow tables 675. Unlike the classifier 657, the MFE daemon 665 may perform one or more resubmits (i.e., be resubmitted back to the classifier with packet data modified based on actions performed by previous matched flow entries).

It should be understood that the architecture shown in FIG. 6 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

Figure 7A:
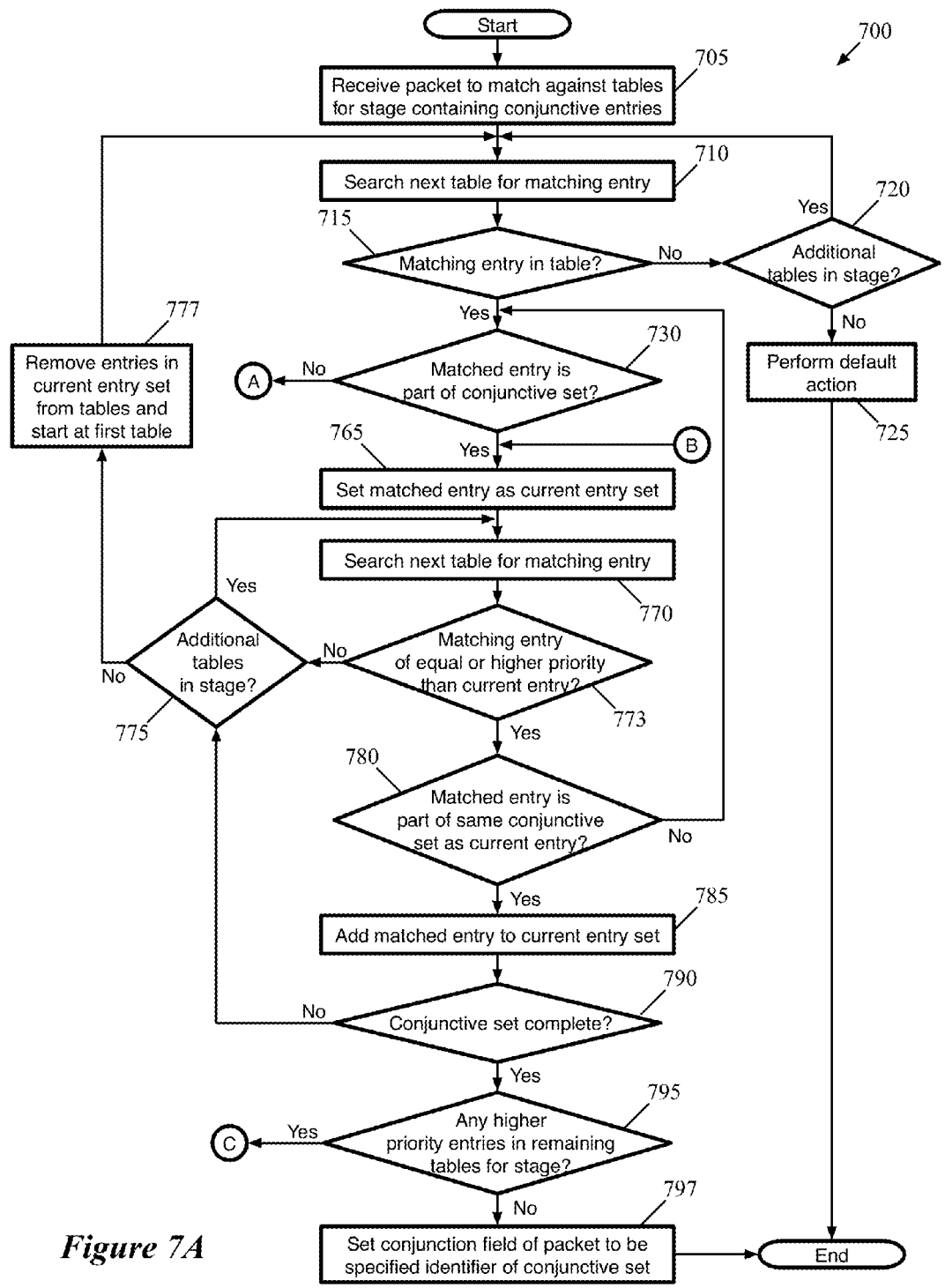
FIGS. 7A-B conceptually illustrate a process for processing a packet through a stage of a packet processing pipeline that includes conjunctive match flow entries.
Figure 7B:
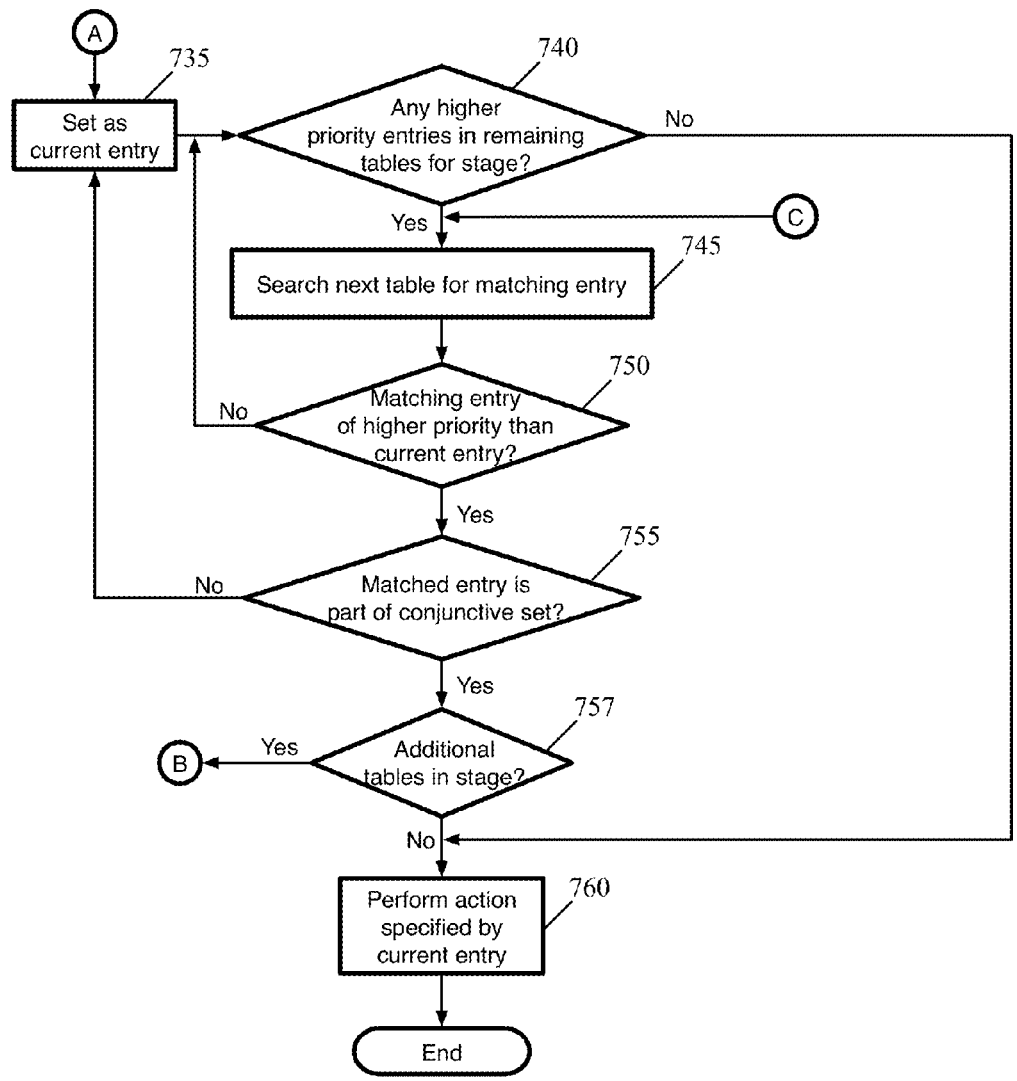

FIG. 7 (split into FIGS. 7A and 7B) conceptually illustrates a process 700 for processing a packet through a stage of a packet processing pipeline that includes conjunctive match flow entries. The process 700 is performed by an MFE such as the MFE 600 in some embodiments. Specifically, for a software forwarding element with a kernel datapath and staged user space flow tables, such as the MFE 600, in some embodiments the process 700 is performed when processing a packet through a particular stage of the user space flow tables.

As shown, the process 700 begins by receiving (at 705) a packet to match against the tables for a packet processing stage that includes conjunctive flow entries. The stage may include a single set of conjunctive entries (i.e., one conjunctive match with a single unique identifier) or multiple sets of conjunctive entries. In addition, some embodiments perform the process 700 for stages that do not include conjunctive match entries, but in such cases many of the operations will never be performed. The packet may be received by the MFE as the result of a resubmit action, if the packet was previously processed (and possibly modified) by an earlier stage of the processing pipeline. This specification often refers to packets and packet headers, as with the packet processed by the MFE in the process 700. The term "packet" is used here as well as throughout this specification to refer to any collection of bits in a particular format sent across a network. It should be understood that the term packet may be used herein to refer to various formatted collections of bits that may be sent across a network, such as Ethernet frames, TCP segments, UDP datagrams, IP packets, etc.

The process then searches (at 710) a next flow table in the ordered set of tables for the stage to attempt to find a matching flow entry. As mentioned, each table includes all of the flow entries for the stage that match on a particular set of packet fields. These packet fields may be packet header fields that are part of the packet as transmitted across a network (e.g., source and destination addresses and ports, etc.), or may be metadata stored with the packet while the packet is processed by the MFE (e.g., the conjunction identifier, ingress port numbers, logical forwarding element identifiers, stage registers, etc.). To search for a matching entry in a flow table, some embodiments use hash tables as an efficient mechanism to find a match. The MFE hashes the value of the packet fields over which the flow table matches, and searches for a matching hash value in the hash table. This matching hash entry points to one of the flow entries, against which the MFE checks the actual packet field values to determine whether a match has actually been found (as opposed to the match being the result of a hash collision).

In some embodiments, the set of tables for a particular stage are searched in a specific order. This order does not need to correspond to the dimensions of a conjunctive match entry and may be determined by either the controller that manages the MFE or the MFE itself based on other factors. For instance, some embodiments order the flow tables with the highest priority flow entries in the first table, so that if one of the high priority standard (non-conjunctive) flow entries is matched in the first table, then the MFE can shortcut out of searching the remaining flow tables.

After searching the current flow table, the process determines (at 715) whether a matching flow entry exists in the table. If no matching entry is found in the hash table, or the only matching entry in the hash does not actually result in a match, then the process may need to search the next table. As such, the process determines (at 720) whether there are any additional flow tables remaining for the stage. If additional flow tables remain (i.e., to match on a different set of packet header fields), the process returns to 710 to search the next packet header field. On the other hand, if the most recently searched table is the last flow table for the stage, then the process performs (at 725) a default action for the stage, as no matching flow entry can be found. This default action might be to drop the packet, increment a stage register for the packet and resubmit the packet to be processed by the next stage, etc.

On the other hand, when a matching flow entry is found in the table at operation 715, the process determines (at 730) whether the matched flow entry is part of a set of conjunctive flow entries. In some embodiments, a flow entry is part of a set of conjunctive flow entries if the action specified by the flow entry is a conjunction action that includes a conjunction identifier and a dimension indication. On the other hand, standard flow entries specify one or more other actions (e.g., dropping a packet, modifying packet header and/or metadata fields, updating a stage register, outputting the packet to a particular port of the MFE, resubmitting the packet, etc.). The flow entries shown in FIGS. 3-5 (other than the last flow entry in each set) are examples of conjunctive flow entries.

When the matched entry is not part of a conjunctive set of flow entries (i.e., the matched entry is a standard entry), the process sets (at 735) the matched entry as a current entry for the stage, but does not yet execute the action specified by the flow entry in case a higher priority flow entry may be found in one of the subsequent tables. As the priorities of the tables may overlap, a simple ordering to the various flow tables for a stage may not exist. For instance, one flow table might have some flow entries of priority 2 and some flow entries of priority 4, while another flow table has entries of priority 2 and priority 3. Irrespective of the ordering, matching a flow entry of priority 2 in the first table will necessitate a search of the second table.

As such, after setting the recently matched flow entry as the current entry, the process 700 determines (at 740) whether any of the remaining tables in the current packet processing stage have any flow entries with a higher priority than the current entry. If this is not the case (i.e., if the current flow entry for the stage has a higher priority than or an equal priority to any unsearched entry), then the process performs (at 760) the set of actions specified by the current entry. In some embodiments, the MFE does not continue searching if only equal priority flow entries remain in the unsearched tables, as the flow entries are required to be designed such that a flow entry cannot match more than one entry at a given priority for a particular stage.

If the current entry is a standard entry, then this action could be to drop the packet, proceed to the next stage (by incrementing the stage register and resubmitting the packet), modify packet field values, etc. As described below, the current entry could be a completed conjunctive set, in which case the MFE performs the conjunction action. In some embodiments, the conjunction action writes the conjunction identifier to a particular metadata field (e.g., the "conj_id" field of the packet). Some embodiments resubmit the packet to the next stage at this point (which should contain a flow table that matches over the conjunction identifier field). In other embodiments, the MFE performs a second search in the current stage to attempt to find a match for the conjunction identifier. In some such embodiments, the flow entry for the conjunction identifier is a high priority flow entry in a separate table for the current stage, which the MFE searches after writing the conjunction identifier to the metadata field. Rather than using a high priority entry for the match on the identifier to ensure that the MFE does not continue matching on the conjunctive set and end up stuck in a loop, some embodiments perform this second search for the stage by first eliminating all of the conjunctive flow entries (e.g., all entries that specify a conjunction action). In this case, the match on the conjunction identifier can have any priority (though, optimally, should have the same priority as the conjunctive set so that the second search does not match and execute a different flow entry instead).

When, at 740, additional tables remain with higher priority entries that could potentially be matched, the process searches (at 745) the next table for the matching entry. In some embodiments, only flow tables with entries that are of a higher priority than the current entry are searched. As such, the next table in this case is the next flow table that contains at least one flow entry of a higher priority than the current entry. The MFE searches this flow table in the same manner as at stage 710, using a hash table with entries that reference the flow entries of the flow table.

The process 700 then determines (at 750) whether the searched flow table includes a matching flow entry of a higher priority than the current entry. The flow table could simply not have a matching flow entry, or the only matching flow entries are of a lower priority than the current flow entry for the stage. In this case, the process returns to 740 to determine whether there are any tables that should be searched. The process continues on this loop until either all tables with higher priority entries have been searched (in which case the process proceeds to 760 to perform the action specified by the current entry) or a new matching flow entry with a higher priority is found.

In that case (a higher priority matching entry is found), the process determines (at 755) whether the matched flow entry is part of a conjunctive set. If the matched flow entry is a standard flow entry, the process (as at 730) proceeds to 735 to set the newly matched flow entry as the current entry, and proceed through operations 740-750 again.

On the other hand, if the matched flow entry is a conjunctive flow entry, the process 700 determines (at 757)

whether any additional tables remain in the stage. If the first table in which a high-priority conjunctive flow entry was matched is the last table in the stage, then clearly the conjunctive set cannot be matched. In this case, the process proceeds to 760 to perform the action specified by the current entry, rather than attempting to match the other dimensions of the conjunctive set (which will have already not been matched at this point). Some embodiments use an additional optimization that determines whether the remaining tables include flow entries for the remaining dimensions of the conjunctive set, and only proceed to 765 if the possibility remains of matching all dimensions of the conjunctive set.

When the most recently matched entry is part of a conjunctive set (either in a search performed at operation 710 or at operation 745, if additional tables remain to be searched), the process sets (at 765) the matched conjunctive flow entry as the current entry set. For conjunctive flows, multiple flow entries must be matched before concluding that a match is found and thus performing the associated action, so the MFE of some embodiments stores (e.g., in volatile memory) the matched entries for a conjunctive flow as a set, and performs a series of operations to determine whether the remaining dimension(s) of the conjunctive flow can be matched. In some embodiments, the MFE keeps statistics for its flow entries (e.g., packet and/or byte counts that indicate the number of packets or total bytes of packets that have matched the flow entry). However, in the case of conjunctive flow entries, these statistics would not be useful, so some such embodiments do not store this information (but do keep statistics for the match on the conjunction identifier).

Thus, the process 700 searches (at 770) the next table (or the next table with flow entries of equal or higher priority compared to that of the current conjunctive flow entry set). Again, this search is performed by the MFE using a hash table to find a match, as described for 710. The process then determines (at 773) whether a matching entry is found in the current table that has a priority equal to or higher than the current conjunctive set. As noted above, some embodiments require all flow entries in a conjunctive set to have the same priority, so equal priority flow entries must be searched and considered as well in order to find matches in the other dimensions of the current conjunctive flow entry.

When no such entry is found, the process determines (at 775) whether any additional tables remain in the stage (e.g., tables that have flow entries of a higher or equal priority to the current conjunctive set). When this is the case, the process returns to 770 to search the next table that meets the priority qualifications. On the other hand, if all of the tables with equal or higher priority have been searched and the full conjunctive set has not been matched, then there is no match for the conjunctive set. However, the matched dimensions of the conjunctive set could be blocking matches of lower priority entries (either standard flow entries or conjunctive flows).

As such, if no additional tables remain at 775, rather than simply performing a default action for the stage, the process removes (at 777) the flow entries in the current conjunctive flow entry set from the flow tables (i.e., any flow entries matched for the current conjunctive flow), and re-starts the lookups at the first table for the stage (returning to 710). In some embodiments, the entries are not actually removed from the flow table (as they may be needed for subsequent packets), but instead the MFE flags the flow entries to not be considered for the current packet. This allows the MFE to search for lower priority flow entries that may have been blocked by the uncompleted conjunctive flow. In addition, as described below regarding variations to the process 700, in some embodiments the MFE does not have to re-start from the beginning of the stage, but instead stores the information needed to re-evaluate the stage without the deleted flows as it works through the tables the first time.

However, if at 773 the process 700 has found a matched entry that has an equal or higher priority to the current entry, the process determines (at 780) whether the matched flow entry is part of the same conjunctive set as the current entry set. In some embodiments, for the matched flow entry to be part of the same conjunctive set as the current entry set, the conjunction identifier that is a parameter of the conjunction action of the flow entry must match that of the current entry set, and the priority must be the same. The dimension of the newly matched flow entry within the conjunctive set could be different from that of the flow entries already within the set, or the dimension could be the same as one of the previously matched entries (if a dimension is disjunctive and has flow entries in multiple tables).

If the matched flow entry is not part of the current conjunctive set, then the priority of the newly matched flow entry must be higher than the current set (because the priorities are designed so that packets cannot match multiple equal-priority flow entries for a given stage), and the process returns to 730 to determine whether this higher-priority entry is part of a new conjunctive set or is a standard flow entry.

On the other hand, when the newly matched entry is part of the same conjunctive set as the current set of flow entries, the process adds (at 785) the newly matched flow entry to the set of current conjunctive flow entries. Some embodiments add the flow entry even when it has the same dimension within the conjunctive set as one of the flow entries already in the set, so that if the entire conjunctive set is not matched, all of the matched flow entries for the set can be removed at operation 777.

The process 700 then determines (at 790) whether the conjunctive set is complete. That is, the process determines whether all dimensions of the conjunctive set have been matched. The conjunction action in each of the flow entries specifies not only the conjunction identifier, but also to which dimension the flow entry belongs and the total number of dimensions. This enables the MFE to determine whether all of the dimensions of the conjunctive set have been matched. If additional dimensions remain unmatched, the process returns to 775 to either search additional flow tables (if more tables remain to be searched) or remove the current entries if the MFE concludes that the conjunctive set cannot be completed.

If the conjunctive set is complete, however, the process treats this in the same manner as a standard matched flow entry, and determines (at 795) whether any of the remaining tables for the stage have higher priority flow entries than the completed conjunctive set. If additional tables remain to be searched, the process proceeds to 745 to search the next table. On the other hand, if there are no more tables to search, the process 700 sets (at 797) the conjunction identifier field of the packet to the identifier specified in the conjunction actions of the current set (as described above by reference to operation 760), and the process 700 ends (and then, e.g., the MFE performs another search for a match on the conjunction identifier). The process may also resubmit the packet, or any other actions specified by the conjunctive set.

It should be understood that the process 700 is merely conceptual and that many variations on the process may exist in the MFEs of different embodiments. For instance, some embodiments store the highest priority matching entry in each table searched by the MFE, rather than only storing a current entry (or current conjunctive set of entries). The MFE still, in some such embodiments, determines after each table is searched whether a completed conjunctive set or a standard flow has been found that it of a higher priority than any remaining tables, and shortcuts out to perform the specified action in that case. However, storing (e.g., in memory) the highest priority matching flow entry in each table allows for more efficient searching when the highest priority flow entry is an incomplete conjunctive set. In this case, rather than (at 777) starting back at the first table, the MFE only needs to find new flows from the tables where the highest-priority matching entry was part of the incomplete conjunctive set. In addition, in some embodiments, the MFE does not even need to re-search these tables; instead, all of the flow entries in a single table that match on the same packet field value are linked to each other (e.g., via pointers). As such, the MFE can use this linking (e.g., by following the pointer) to quickly identify the next highest priority flow entry that the packet matches in the table or tables where the incomplete conjunctive flows were the highest priority match.

FIGS. 8-14 conceptually illustrate the processing of packets through various flow tables of a stage of a processing pipeline that includes conjunctive flow entries, according to some embodiments of the invention. These examples illustrate simplified flow entries in each table, that specify match conditions, actions, and priority. For simplicity, prerequisite match conditions (e.g., a check over the Ethertype for flow entries requiring IP address matching) are not shown. In addition, the figures only illustrate the relevant data for each packet (over which the flow entries are matched). These examples also do not show the conjunction identifier matching flow entry or entries as part of the flow tables for the stages. As described above, in some embodiments these flow entries are part of the subsequent stage, while in other embodiments the stages with a conjunctive flow also include a flow table with entries that match over the conjunction identifier. As mentioned, in some embodiments a high priority is used for these flow entries so that once the conjunction identifier is set for the packet, these flow entries will take precedence over the other possible matches. Other embodiments use the same priority as the conjunctive set, and perform this second search for the stage by first eliminating all of the conjunctive flow entries (e.g., all entries that specify a conjunction action).

Figure 8:
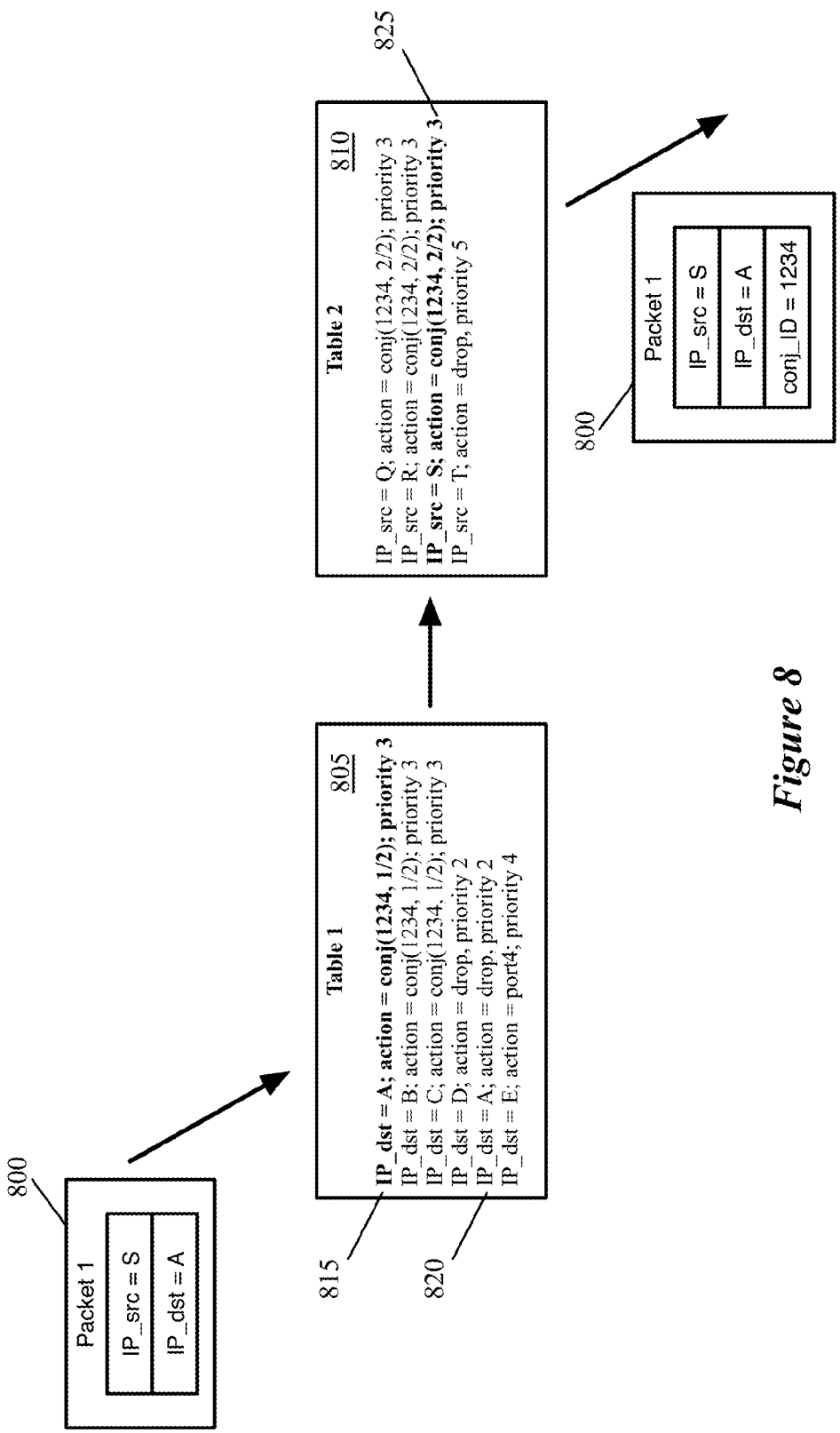
FIGS. 8-14 conceptually illustrate the processing of packets through various flow tables of a stage of a processing pipeline that includes conjunctive flow entries, according to some embodiments of the invention.

FIG. 8 illustrates an example of a successful conjunctive match for a packet 800 that has a source IP address of "S" and a destination IP address value of "A". As shown, the packet processing stage includes two tables 805 and 810. The first table 805 matches over the destination IP address field and the second table 810 matches over the source IP address field. When the packet begins the illustrated stage (e.g., because it has a stage register value equal to the value for this stage), the MFE first processes the packet against the table 805. The MFE hashes the destination IP address and searches a hash table for a match. In this case, two matches would be found, for the conjunctive flow entry 815 and for the standard flow entry 820. As the conjunctive flow entry 815 has a higher priority than the standard flow entry 820, the conjunctive flow entry is treated as the matching entry for this table 805.

The MFE then proceeds to the second table 810, which matches on the source IP address. In this table, a single matching flow entry 825 is found by the MFE. This matching flow entry completes the conjunctive set with the flow entry 815, so the MFE can execute the conjunction action and store the conjunction identifier 1234 in a metadata or register field of the packet 800.

Figure 9:
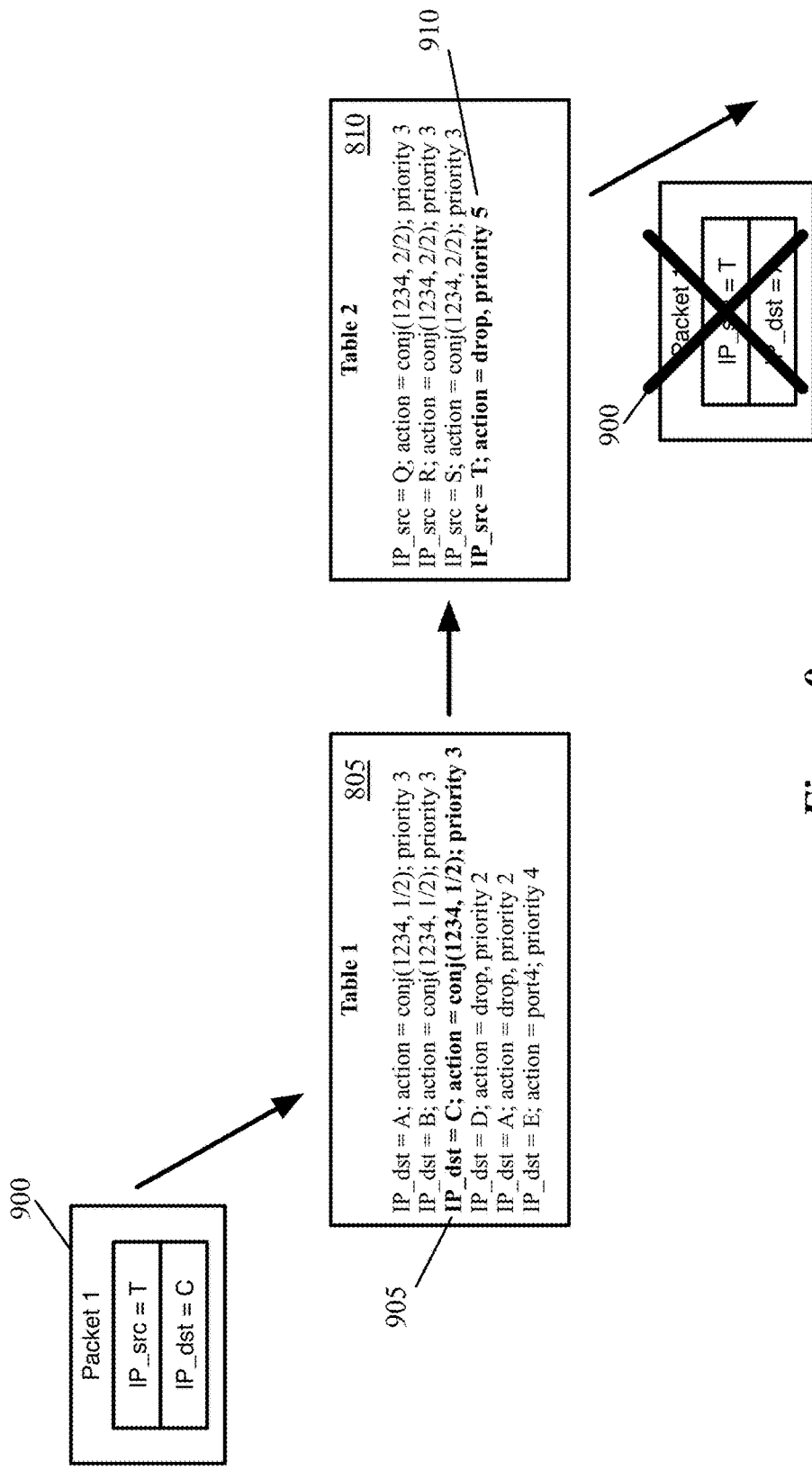

FIG. 9 illustrates an example of case in which a conjunctive flow entry is matched in a first table but a standard flow entry with a higher priority is then matched in a second table and used. This example uses the same tables 805 and 810 as in FIG. 8, with the MFE processing a different packet 900 through the stage. The packet 900 has a source IP address value of "T" and a destination IP address value of "C". When the packet 900 begins the stage, the MFE processes the packet against the table 805 and finds a matching flow entry 905 based on the destination IP address. As in the previous example, this matched flow entry is part of a conjunctive flow. However, in the second table, the MFE matches a standard flow entry 910 with a higher priority (5) than the conjunctive flow (3). As this is the last flow table in the stage, the MFE treats this flow entry 910 as the entry to execute, and drops the packet 900 as specified by the flow entry.

Figure 10:
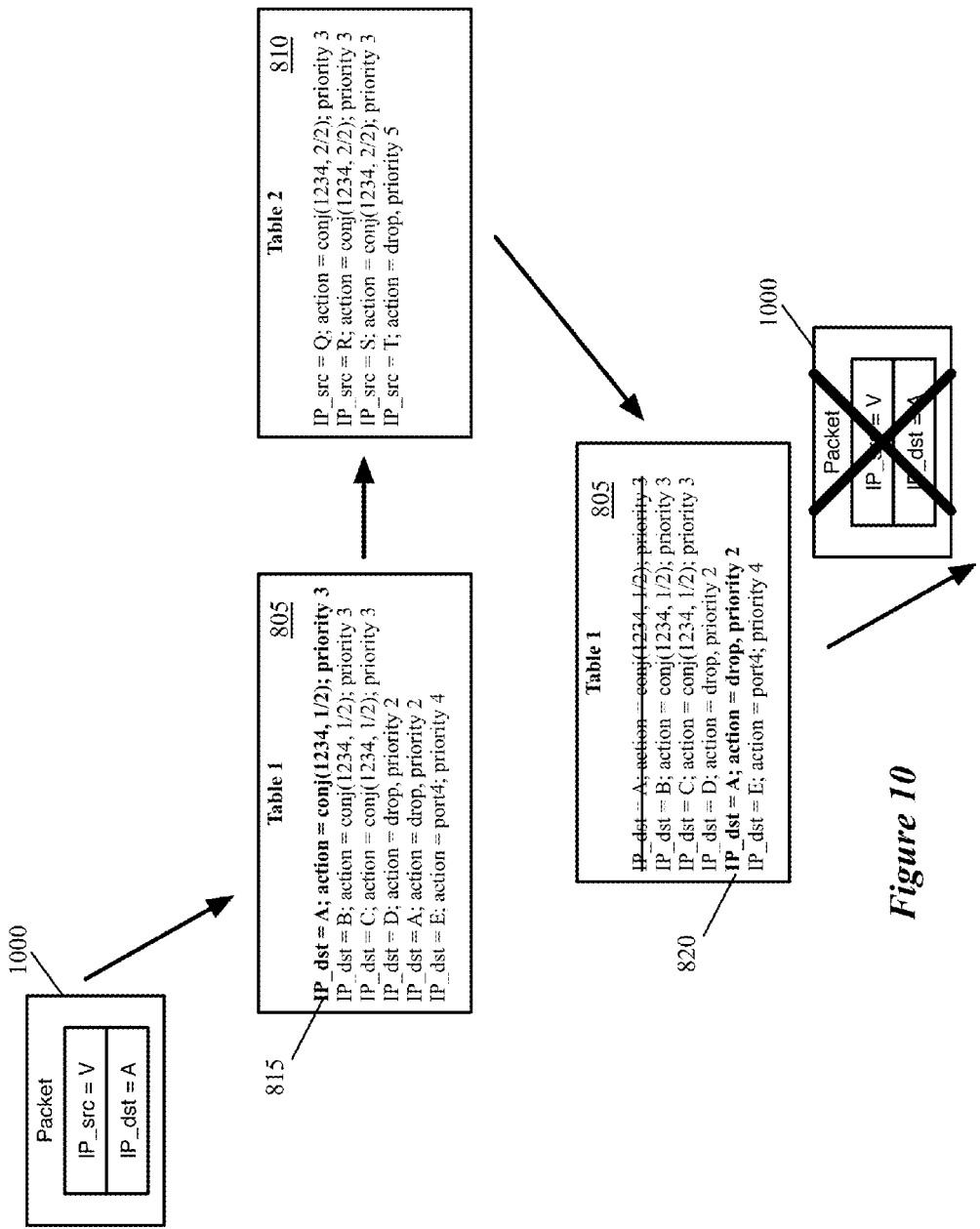

FIG. 10 illustrates an example using the same packet processing stage with flow tables 805 and 810 in which the MFE fails to find a full conjunctive set and returns to the first table. As shown, the packet 1000 has a source IP address value of "V" and a destination IP address value of "A". Thus, as in FIG. 8, the packet matches the flow entry 815 in the first table, as this is the higher-priority entry that matches on the destination IP address "A". However, in the second table, the source IP address "V" does not match any of the entries in this table. As such, the conjunctive set 1234 is not completed, and the MFE restarts the stage at the table 805. To ensure that any lower priority matching flows are found, the MFE searches the flow table 805 without the flow 815, and as a result the packet 1000 matches the lower priority flow entry 820. Though not shown in the figure, the MFE would also search the second flow table 810 again in some embodiments, as it contains higher priority flow entries than the current matched entry 820. The MFE, of course, does not find a matching entry in this table 810 and thus performs the drop action specified by the flow entry 820.

As mentioned above, in some embodiments the flow entry 815 (or the entry in the hash table that points to the flow entry 815) links to the flow entry 820, so the table 805 need not be re-searched in full. In such embodiments, the second table 810 would not need to be re-searched, as the MFE would store the fact that no matching entry was found the first time searching this table.

Figure 11:
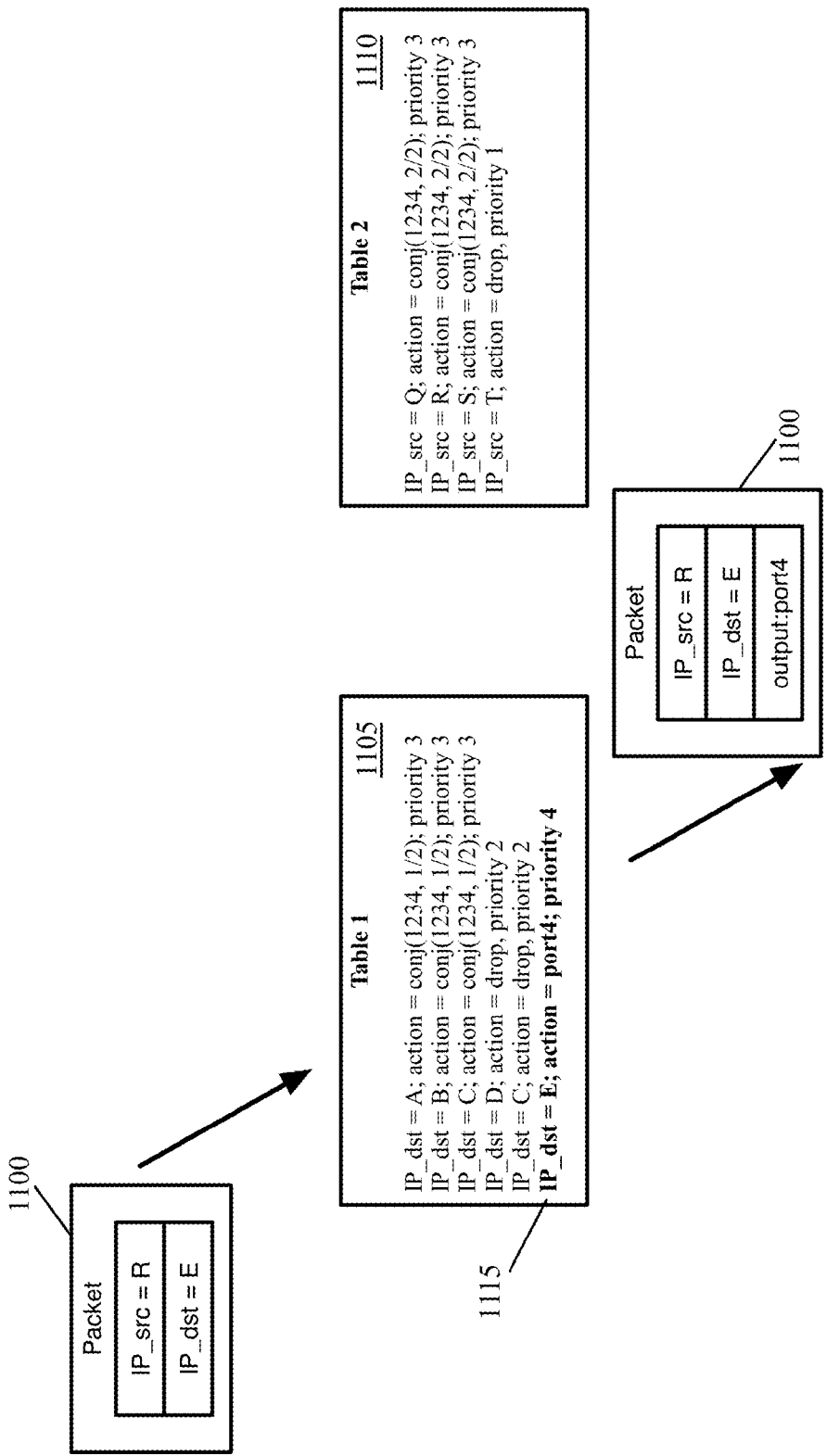

FIG. 11 illustrates an example in which the MFE finds a matching flow entry in a first table for a stage and subsequently skips the remaining tables for the stage. As shown, the packet processing stage includes two tables 1105 and 1110 that are very similar to the tables of FIG. 8. However, the second table 1110 does not include any flow entries with a priority higher than 3. The packet 1100 in this case has a source IP address "R" and a destination IP address "E". When the MFE searches the first table 1105, it finds the matching flow entry 1115, which is a standard flow entry having a priority 4. As the second flow table 1110 does not have any flow entries with a priority higher than 4, the MFE can skip searching this table and output the packet 1100 to port 4 (shown here as data appended to the packet, until the MFE reassembles the packet and outputs it onto the network).

Figure 12:
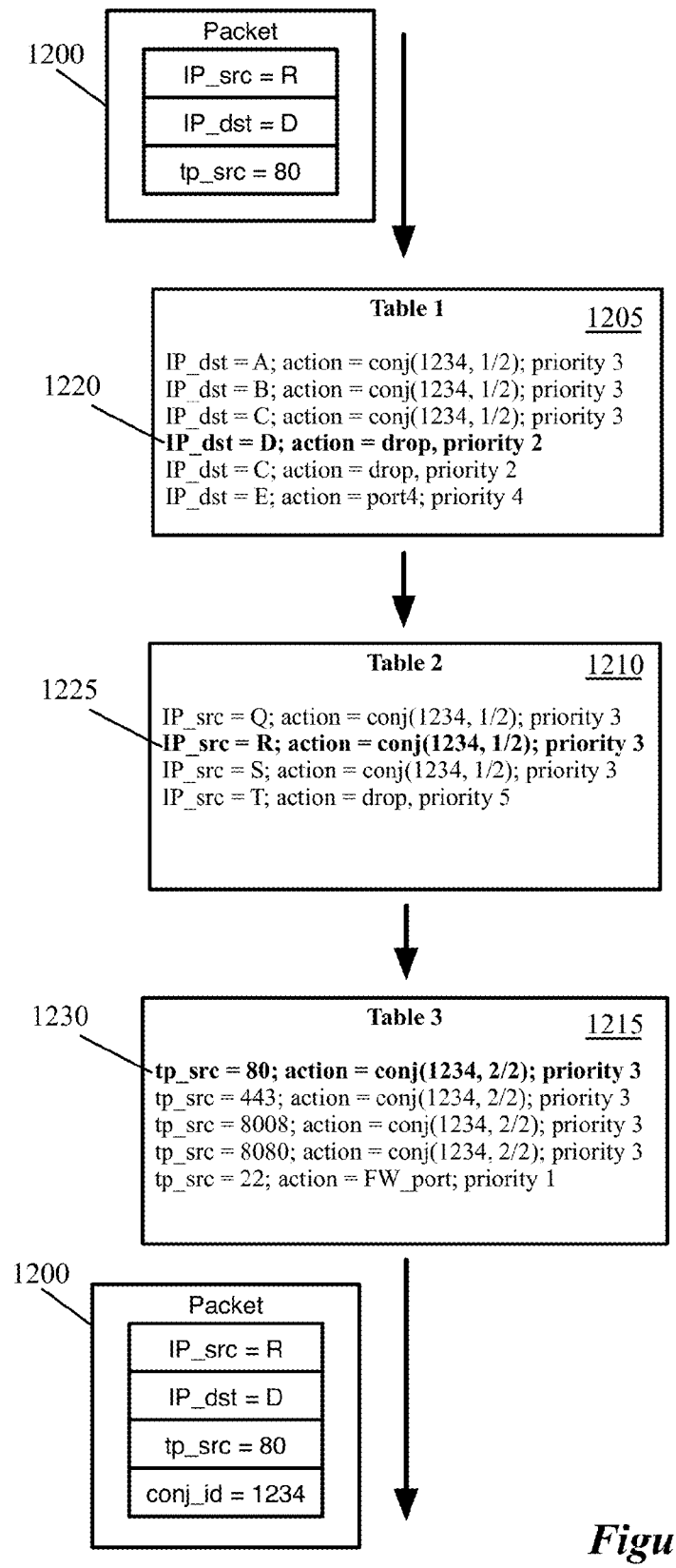

FIG. 12 illustrates an example where one of the dimensions of a conjunctive match entry is disjunctive, and only one of these dimensions is matched. As shown, in this case the current packet processing stage through which a packet 1200 is processed has three tables 1205-1215. The packet 1200, as shown, has a source IP address value of "R", a destination IP address value of "D", and a source transport port value of "80". The first table 1205 matches over the destination IP address, and a standard flow entry 1220 with priority 2 is matched at this stage. As the other tables 1210 and 1215 include higher-priority flow entries, the MFE continues to search these tables.

When searching the second table 1210 which matches over the source IP address, the MFE identifies a matching flow entry 1225 with priority 3. As this is a higher priority entry than the currently set flow entry 1220, the MFE stores (e.g., in memory) the matching conjunctive flow entry 1225, and proceeds to the third table 1215. Searching this flow table results in a matching flow entry 1230 based on the source transport layer port value. Together, the flow entries 1225 and 1230 form a complete conjunctive set (i.e., with both dimensions matched). As such, at this point the MFE performs the conjunction action specified by these flow entries, storing the conjunction identifier "1234" in a metadata/register field of the packet 1200.

Figure 13:
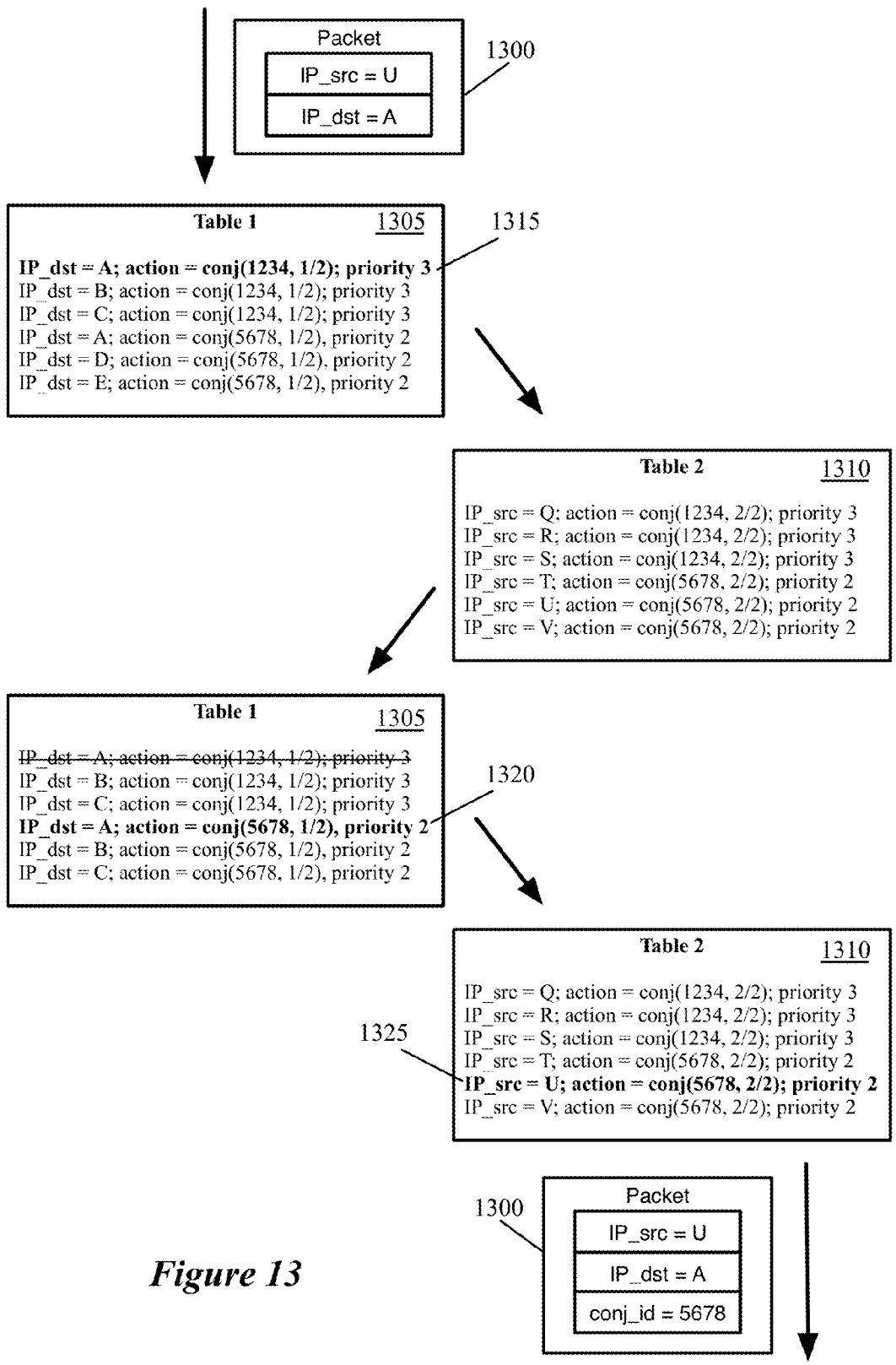

Finally, FIG. 13 illustrates an example in which a first higher priority conjunctive set cannot be completed, and blocks a second lower priority conjunctive set. In this example, the packet processing stage includes two flow tables 1305 and 1310, which match over the destination and source IP addresses respectively. The MFE receives a packet 1300, with a source IP address value of "U" and a destination IP address value of "A". As shown, initially, the MFE identifies a flow entry 1315 in the first table 1305 that matches the value "A" and has a priority 3. This flow entry is part of a conjunctive set with the identifier 1234. However, the only match in the second table 1310 has a lower priority 2, and therefore is not treated as a valid match.

At this point, the end of the stage has been reached without finding a standard match or a complete conjunctive set, so the MFE begins again at the first table 1305, while ignoring the previously matched conjunctive entry 1215. The destination IP address value "A" also matches a second flow entry 1320 with priority 2, which is part of a conjunctive set with the identifier 5678. Thus, the MFE stores this conjunctive entry in memory and proceeds to the second table 1310 again. This time, a match having the same priority 2 is found for the source address value "U". As this completes the conjunctive set, the MFE performs this conjunction action, storing the conjunction identifier "1234" in a metadata/register field of the packet 1300.

As mentioned above, rather than restarting the search from the beginning, the MFE of some embodiments would have found the flow entry 1325 when searching the second table 1310 the first time through. After determining that the conjunctive set "1234" is not completed, the MFE then uses the link from the conjunctive flow entry 1315 to the lower priority conjunctive flow entry 1320 (that matches on the same packet field value) to identify the flow entry 1320 without another hash table lookup. The MFE can then identify the completed conjunctive flow "5678" without re-searching the second table 1310 at all.

Figure 14:
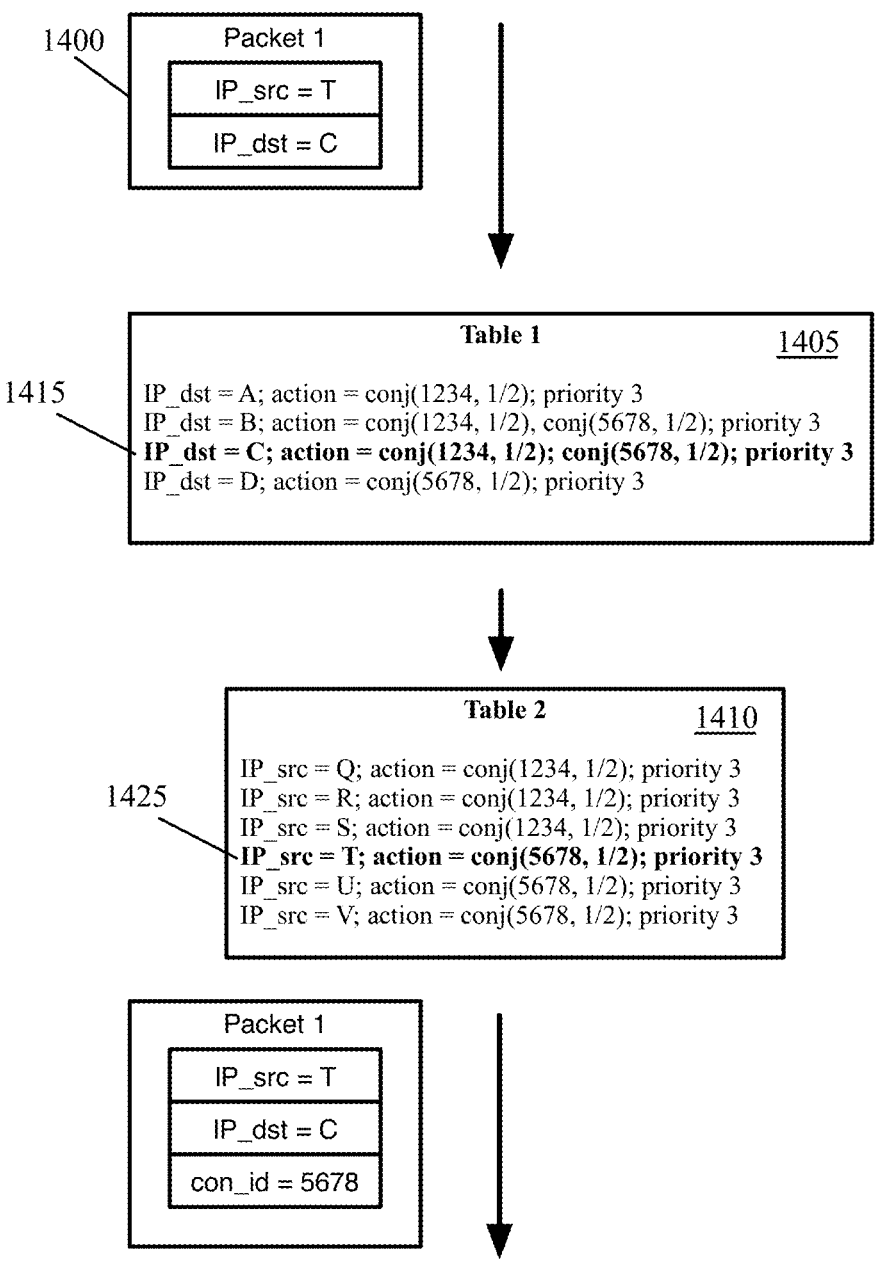

FIG. 14 illustrates that conjunctive flows may have overlap within dimensions, either partially or completely. In this case, the current stage of packet processing includes two conjunctive sets, generated from a first conjunctive data tuple "IP_dst∈{A, B, C} AND IP_src∈{Q, R, S}" and a second conjunctive data tuple "IP_dst∈{B, C, D} AND IP_src∈{T, U, V}". If the flow entries for these two data tuples are processed at the same stage, and share the same priority (unlike the example of FIG. 13, in which the conjunctive sets overlapped but at different priorities), some embodiments optimize the flows by generating flow entries that specify conjunction actions for both of the conjunctive sets. This optimization of the flow entries may be performed by the network controller that generates the flow entries in some embodiments, or by the MFE in other embodiments. It should be noted that, in some embodiments, the priorities can only be the same for two or more conjunctive sets so long as there is at least one dimension in which they are completely disjoint, so that no packet could match all dimensions of both sets.

In this example, a packet 1400 with a source IP address value of "C" and a destination IP address value of "T" is processed against the tables 1405 and 1410 of the stage, with the first table 1405 including the overlapping conjunctive entries. When processed against this first table 1405, the packet matches the flow entry 1415 based on its destination IP address "C". This conjunctive entry specifies two conjunctive sets in its actions. In some embodiments, the MFE stores both of these conjunctive sets in memory as current entry sets (e.g., at operation 765 of the process 700 or a similar operation of a similar MFE process), and checks after each matched entry is added to the set whether any conjunctive matches are complete. In the second table 1410, the packet matches the flow entry 1420 based on the source IP address "T". This flow entry specifies only one conjunction action (for the identifier 5678), so the MFE determines at this point that the conjunctive set has been matched and writes this conjunction identifier to the packet metadata.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
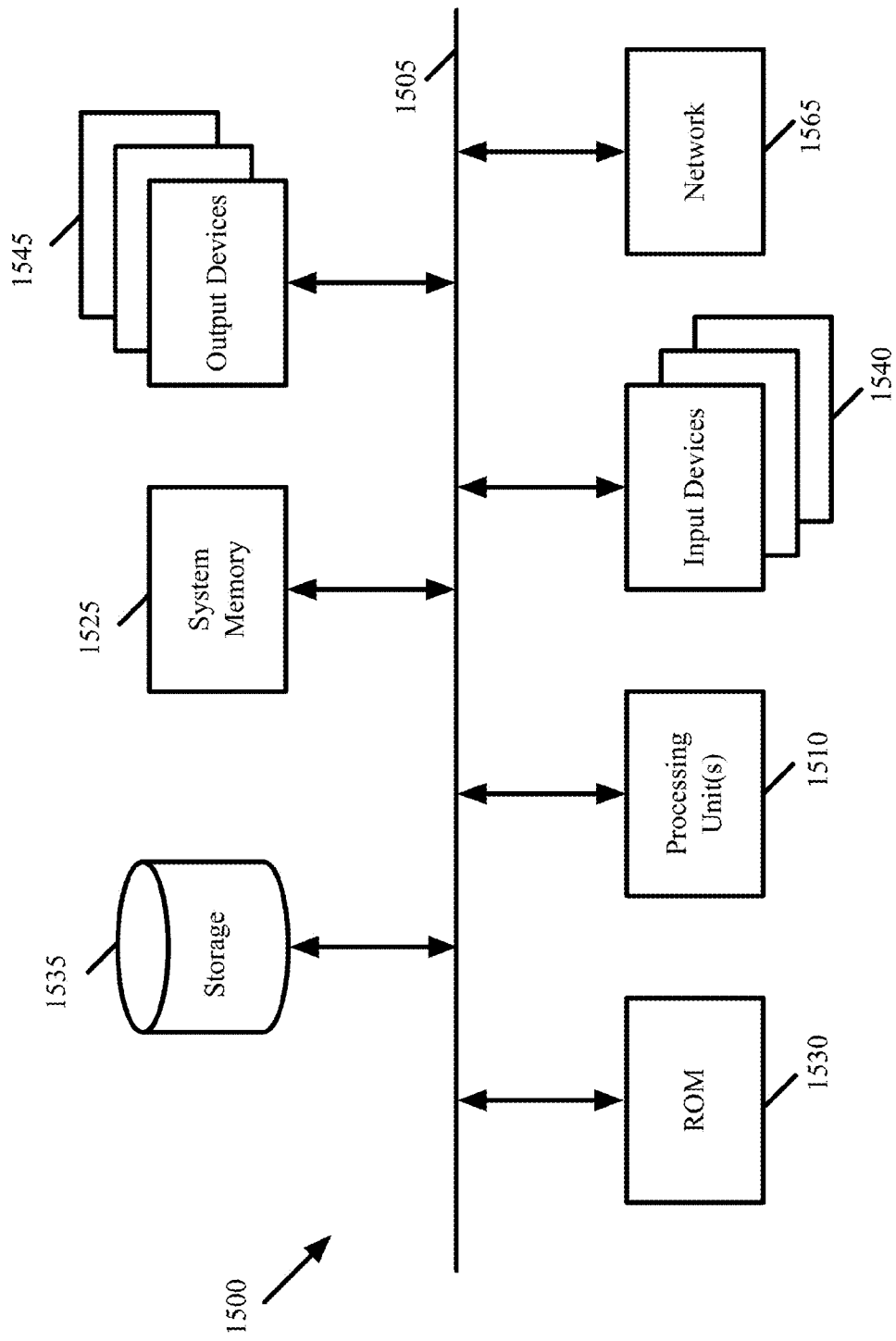
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. For a network controller that manages a managed forwarding element (MFE), a method comprising:
   receiving a set of data tuples that define packet processing behavior of the MFE, wherein a particular one of the data tuples defines (i) a match condition with at least two conjunctive dimensions and (ii) an action for the MFE to take on a packet that matches an element from each of the dimensions, each of the dimensions comprising at least one element;
   for each dimension of the match condition, generating a set of flow entries that each match on a different element of the dimension and specify an action that includes a conjunction identifier, wherein for each set of flow entries a same action is specified by each flow entry in the set;
   generating a conjunction flow entry that matches on the conjunction identifier and specifies the action defined by the particular data tuple, wherein the conjunction identifier is matched when at least one of the flow entries for each dimension of the match condition is matched; and
   distributing the conjunction flow entry and the sets of flow entries to the MFE, wherein the MFE uses the flow entries to process packets.

2. The method of claim 1, wherein the network controller is a local controller that operates on a same physical machine as the MFE.

3. The method of claim 2, wherein the local controller receives the data tuples from another network controller that distributes data tuples to a plurality of local controllers.

4. The method of claim 2, wherein the network controller and MFE operate on a physical host machine that also hosts a plurality of data compute nodes for which the MFE is a first-hop forwarding element.

5. The method of claim 1, wherein a packet received by the MFE that matches a flow entry generated for each of the dimensions subsequently matches the conjunction flow entry.

6. The method of claim 1, wherein each flow entry is assigned a priority, wherein a same priority is assigned to all of the flow entries generated for all of the dimensions of the match condition.

7. The method of claim 1, wherein a first flow entry of the set of flow entries for a particular dimension of the match condition matches on a first field and a second flow entry of the set of flow entries for the particular dimension of the match condition matches on a second field.

8. The method of claim 1, wherein all of the flow entries for a first dimension match on a first field and all of the flow entries for a second dimension match on a second field.

9. A machine readable medium storing a network controller application which when executed by at least one processing unit manages a managed forwarding element (MFE), the network controller application comprising sets of instructions for:
   receiving a set of data tuples that define packet processing behavior of the MFE, wherein a particular one of the data tuples defines (i) a match condition with at least two conjunctive dimensions and (ii) an action for the MFE to take on a packet that matches an element from each of the dimensions, each of the dimensions comprising at least one element;
   for each dimension of the match condition, generating a set of flow entries that each match on a different element of the dimension and specify an action that includes a conjunction identifier;
   generating a conjunction flow entry that matches on the conjunction identifier and specifies the action defined by the particular data tuple, wherein the conjunction identifier is matched when at least one of the flow entries for each dimension of the match condition is matched; and
   distributing the conjunction flow entry and the sets of flow entries to the MFE, wherein the MFE uses the flow entries to process packets.

10. The machine readable medium of claim 9, wherein the network controller application is a local controller application that executes on a same physical machine as the MFE.

11. The machine readable medium of claim 10, wherein the local controller receives the data tuples from another network controller that distributes data tuples to a plurality of local controllers and executes on a separate physical machine.

12. The machine readable medium of claim 10, wherein the network controller application and MFE operate on a physical host machine that also hosts a plurality of data compute nodes for which the MFE is a first-hop forwarding element.

13. The machine readable medium of claim 9, wherein a packet received by the MFE that matches a flow entry generated for each of the dimensions subsequently matches the conjunction flow entry.

14. The machine readable medium of claim 9, wherein each flow entry is assigned a priority, wherein a same priority is assigned to all of the flow entries generated for all of the dimensions of the match condition.

15. The machine readable medium of claim 9, wherein a first flow entry of the set of flow entries for a particular dimension of the match condition matches on a first field and a second flow entry of the set of flow entries for the particular dimension matches on a second field.

16. The machine readable medium of claim 9, wherein all of the flow entries for a first dimension match on a first field and all of the flow entries for a second dimension match on a second field.

17. An electronic device comprising:
   a set of processing units; and
   a machine readable medium storing a network controller application which when executed by at least one of the processing units manages a managed forwarding element (MFE), the network controller application comprising sets of instructions for:

receiving a set of data tuples that define packet processing behavior of the MFE, wherein a particular one of the data tuples defines (i) a match condition with at least two conjunctive dimensions and (ii) an action for the MFE to take on a packet that matches an element from each of the dimensions, each of the dimensions comprising at least one element;

for each dimension of the match condition, generating a set of flow entries that each match on a different element of the dimension and specify an action that includes a conjunction identifier;

generating a conjunction flow entry that matches on the conjunction identifier and specifies the action defined by the particular data tuple, wherein the conjunction identifier is matched when at least one of the flow entries for each dimension of the match condition is matched; and distributing the conjunction flow entry and the sets of flow entries to the MFE, wherein the MFE uses the flow entries to process packets.

18. The electronic device of claim 17, wherein a packet received by the MFE that matches a flow entry generated for each of the dimensions subsequently matches the conjunction flow entry.

19. The electronic device of claim 17, wherein each flow entry is assigned a priority, wherein a same priority is assigned to all of the flow entries generated for all of the dimensions of the match condition.

20. The electronic device of claim 17, wherein a first flow entry of the set of flow entries for a particular dimension matches on a first field and a second flow entry of the set of flow entries for the particular dimension matches on a second field.

21. The electronic device of claim 17, wherein all of the flow entries for a first dimension match on a first field and all of the flow entries for a second dimension match on a second field.

* * * * *